(12) United States Patent
Bruckman et al.

(10) Patent No.: US 10,416,691 B2
(45) Date of Patent: Sep. 17, 2019

(54) ADAPTIVE PHASE CONTROL OF CRYOCOOLER ACTIVE VIBRATION CANCELLATION

(71) Applicant: Raytheon Company, Waltham, MA (US)

(72) Inventors: Dawson R. Bruckman, Hawthorne, CA (US); Michael H. Kieffer, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 895 days.

(21) Appl. No.: 14/461,226

(22) Filed: Aug. 15, 2014

(65) Prior Publication Data
US 2016/0050490 A1 Feb. 18, 2016

(51) Int. Cl.
*H04R 3/00* (2006.01)
*G05D 19/02* (2006.01)
(Continued)

(52) U.S. Cl.
CPC ........... *G05D 19/02* (2013.01); *F16F 15/002* (2013.01); *F25B 9/14* (2013.01); *F25B 2309/1428* (2013.01); *F25B 2500/13* (2013.01)

(58) Field of Classification Search
CPC H04R 3/002; G05D 19/02; F25B 9/14; F25B 2500/13; F25B 2309/001;
(Continued)

(56) References Cited

U.S. PATENT DOCUMENTS 5,245,830 A 9/1993 Aubrun et al.
5,392,607 A 2/1995 Wu
(Continued)

FOREIGN PATENT DOCUMENTS

EP 1 762 795 A2 3/2007
GB 2 279 770 A 1/1995
(Continued)

OTHER PUBLICATIONS

Notification of Transmittal of the International Search Report and the Written Opinion of the International Searching Authority, or the Declaration dated Oct. 8, 2015 in connection with International Patent Application No. PCT/US2015/035974.
(Continued)

*Primary Examiner* — Sujoy K Kundu
*Assistant Examiner* — L. Anderson

(57) ABSTRACT

A method includes identifying a magnitude and phase angle of vibration forces resulting from a previous cancellation signal, where a first measured force vector is defined by this magnitude and phase angle. The method also includes identifying a magnitude and phase angle of a first cancellation force and transmitting a first AFF cancellation signal configured to generate the first cancellation force, where a first cancellation force vector is defined by this magnitude and phase angle. The method further includes identifying a magnitude and phase angle of vibration forces resulting from the first AFF cancellation signal, where a first resultant force vector is defined by this magnitude and phase angle. Moreover, the method includes determining whether a phase angle difference between the phase angles of the first resultant force vector and the first measured force vector is substantially equal to zero. If so, the method includes continuing to transmit the first AFF cancellation signal.

21 Claims, 9 Drawing Sheets

(51) Int. Cl.
*F25B 9/14* (2006.01)
*F16F 15/00* (2006.01)

(58) Field of Classification Search
CPC ......... F25B 2309/1428; F02G 2275/10; H02P 9/42; F16F 15/02
See application file for complete search history.

(56) References Cited

U.S. PATENT DOCUMENTS

| | | |
|---|---|---|
| 5,836,165 A | 11/1998 | Champion et al. |
| 5,864,273 A | 1/1999 | Dean et al. |
| 7,152,495 B2 | 12/2006 | Peck |
| 7,779,640 B2 | 8/2010 | Price et al. |
| 8,516,834 B2 | 8/2013 | Snow et al. |
| 8,639,388 B2 | 1/2014 | Hon et al. |
| 2013/0192274 A1 | 8/2013 | Heiss et al. |
| 2014/0013842 A1 | 1/2014 | Holliday |
| 2014/0015497 A1 | 1/2014 | Holliday |

FOREIGN PATENT DOCUMENTS

| | | |
|---|---|---|
| GB | 2 318 887 A | 5/1998 |
| JP | H03219139 A | 9/1991 |

OTHER PUBLICATIONS

Communication from foreign patent office in counterpart foreign application, "Notice of Reasons for Rejection," Japanese Application No. JP 2017-508547, dated Feb. 20, 2018, 11 pages.

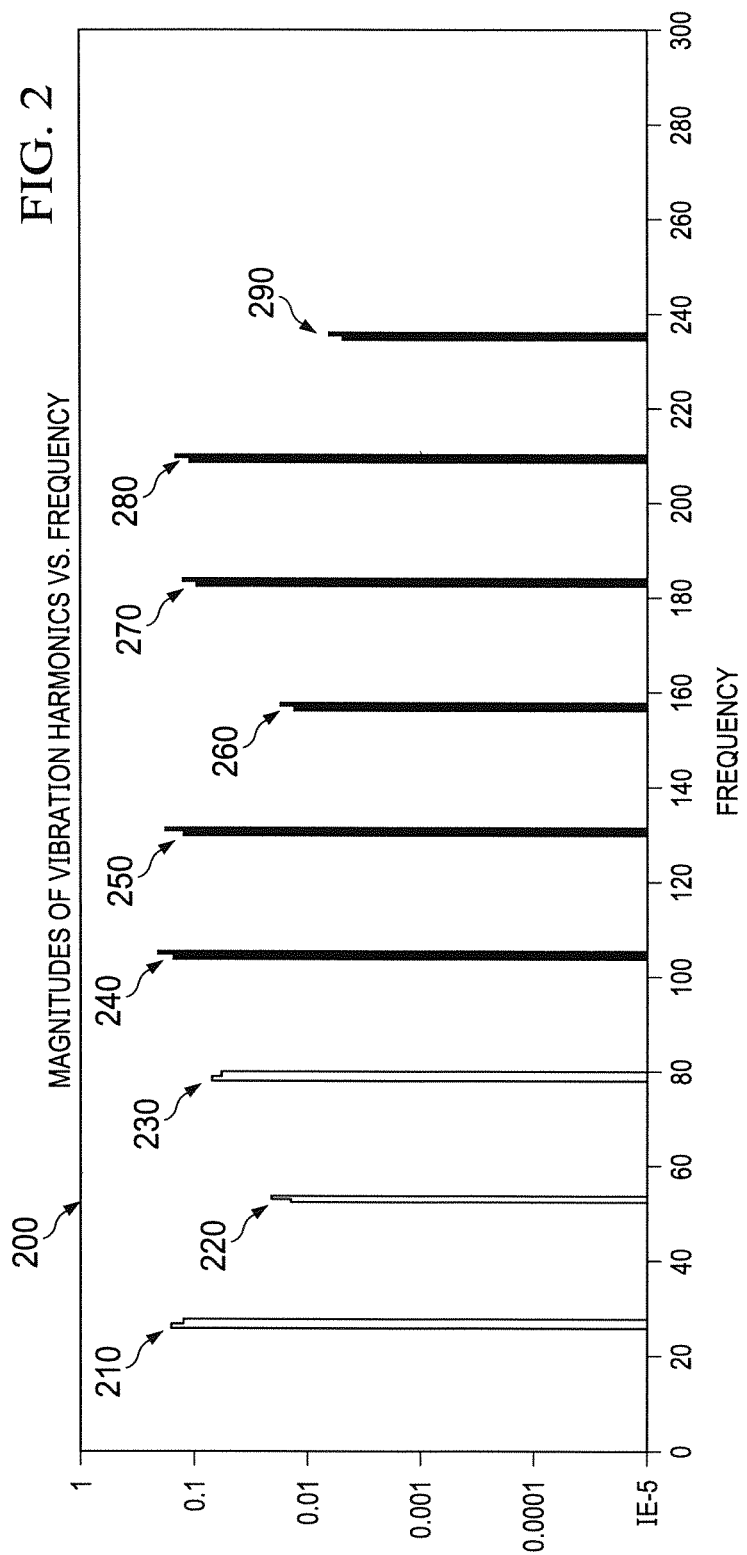

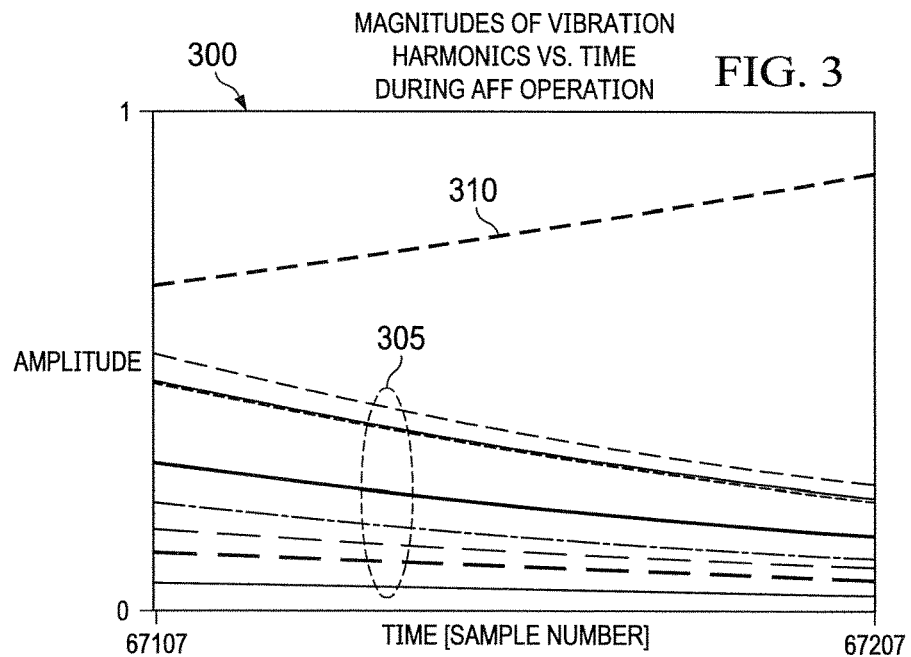
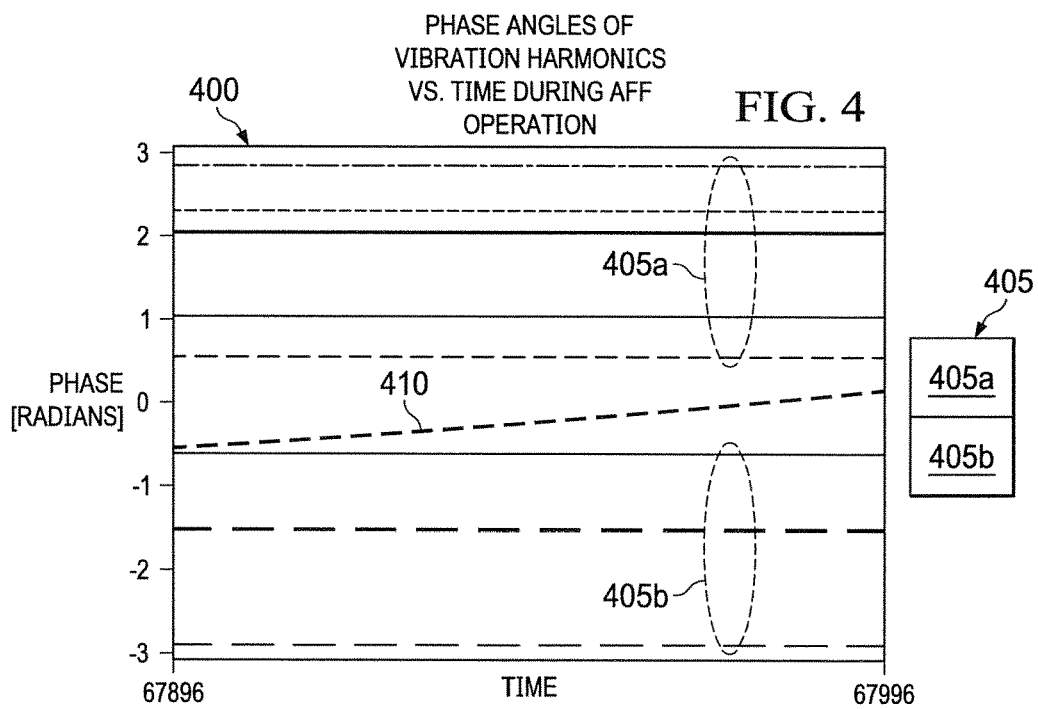

PHASE COMMAND = P x {-Δθ + $I$(-Δθ)} + QUADRANT CHECK

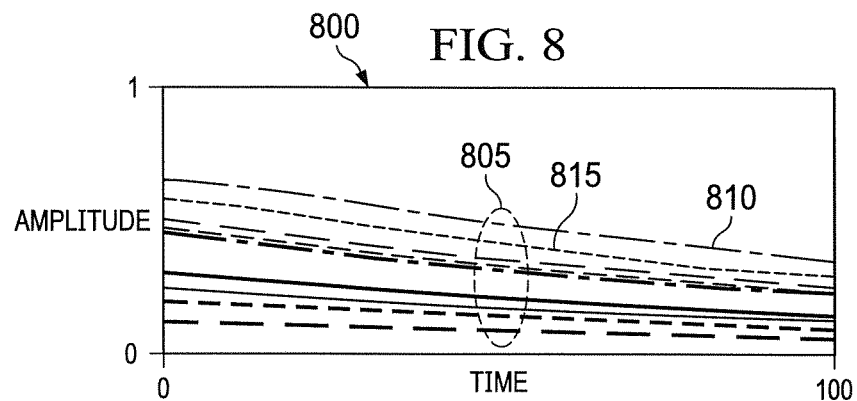
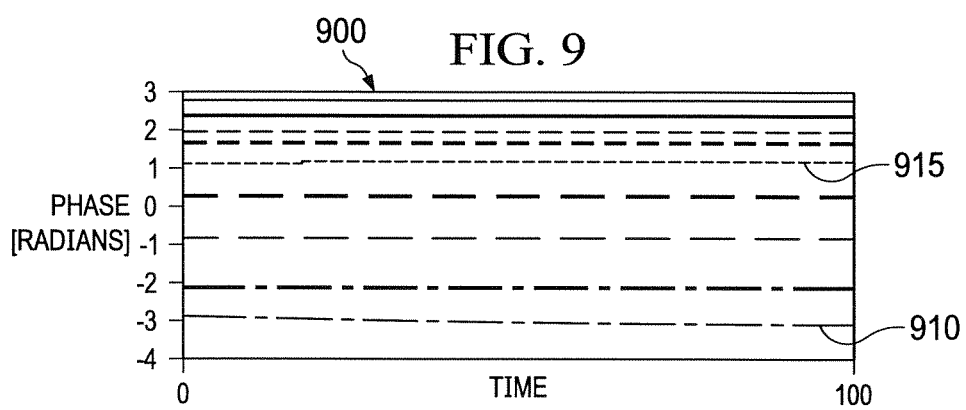
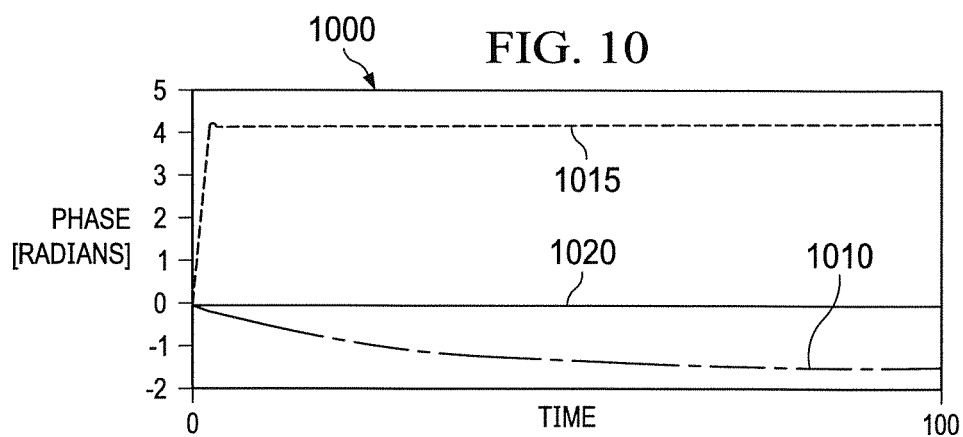

ADAPTIVE PHASE CONTROL OF CRYOCOOLER ACTIVE VIBRATION CANCELLATION

TECHNICAL FIELD

The present disclosure is directed generally to cryogenic coolers. More specifically, the present disclosure is directed to adaptive phase control of cryogenic cooler active vibration cancellation, such as for a Stirling cycle cryogenic cooler.

BACKGROUND

A spacecraft can include various types of sensors for capturing images, computers for receiving and processing signals from the sensors, and communication modules for transmitting data. A Stirling cycle cryogenic cooler can be used to remove heat from the sensors and cool the sensors to very low temperatures, in the range of 5 Kelvin (K)-100K. The cryogenic cooler includes several moving components, such as one or more compressor pistons, an expander piston (also referred to as a displacer piston), balancer mass that counteracts the forces of the expander piston. Each of these moving components is driven by a linear motor, which is part of the moving component assembly. For example, a piston assembly includes a wire coil wound around a bobbin that annularly surrounds the shaft portion of the piston; the piston assembly sits in a magnetic field, and upon receiving current through the coil, an electromagnetic force drives the piston in a linear motion. These moving components generate vibrations that will limit the performance of the various sensors if the vibrations are not reduced. The moving components generate vibrations at the fundamental motor drive frequency, as well as many of the harmonics of the motor drive frequency. The Stirling cycle cryogenic cooler can include an adaptive feed-forward (AFF) vibration control system to suppress the vibrations associated with moving components of the cryogenic cooler at the fundamental frequency and higher harmonics.

As an example, a Stirling cycle cryogenic cooler system can include piezoelectric force transducers that sense physical vibrations that the cryocooler creates and that generate electrical output signals corresponding to the sensed vibrations. The AFF control system includes processing circuitry that analyzes the transducers' output signals and that generates a cancellation signal which is output to the motor drive circuits. In response to receiving the cancellation signal, the pistons and balancer mass are driven in such a way as to substantially cancel the vibration forces of the fundamental frequency and many of its harmonics.

SUMMARY

This disclosure provides adaptive phase control of cryogenic cooler active vibration cancellation, such as for a Stirling cycle cryogenic cooler.

In one embodiment, a method for adaptive feed-forward (AFF) vibration control using adaptive phase control (APC) in an active vibration cancellation process is provided. The method includes identifying a magnitude and a phase angle of vibration forces resulting from a previous command signal, where a first measured force vector is defined by the magnitude and the phase angle of the vibration forces resulting from the previous command signal. The method also includes identifying a magnitude and a phase angle of a first cancellation force, where a first cancellation force vector is defined by the magnitude and the phase angle of the first cancellation force. The method further includes transmitting a first AFF command signal configured to generate the first cancellation force. The method also includes identifying a magnitude and a phase angle of vibration forces resulting from the first AFF command signal, where a first resultant force vector is defined by the magnitude and the phase angle of the vibration forces resulting from the first AFF command signal. The method further includes determining whether a transfer function represented by a phase angle difference between the phase angle of the first resultant force vector and the phase angle of the first measured force vector is substantially equal to zero. In addition, the method includes, in response to determining that the phase angle difference is substantially equal to zero, continuing to transmit the first AFF command signal.

Other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description, taken in conjunction with the accompanying drawings, in which:

FIG. 2 illustrates example magnitudes of vibration harmonics versus frequency for an AFF controller that does not include an APC module according to this disclosure;

FIG. 3 illustrates example magnitudes of vibration harmonics versus time during AFF operation according to this disclosure;

FIG. 4 illustrates example phase angles of vibration harmonics versus time during AFF operation according to this disclosure;

FIG. 8 illustrates an example simulation of vibration magnitudes versus time during AFF operation using an APC module according to this disclosure;

FIG. 9 illustrates an example simulation of vibration phase angles of vibration harmonics versus time during AFF operation according to this disclosure;

FIG. 10 illustrates an example MPDO values versus time using an APC module according to this disclosure;

DETAILED DESCRIPTION

FIGS. 1 through 12, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1A:
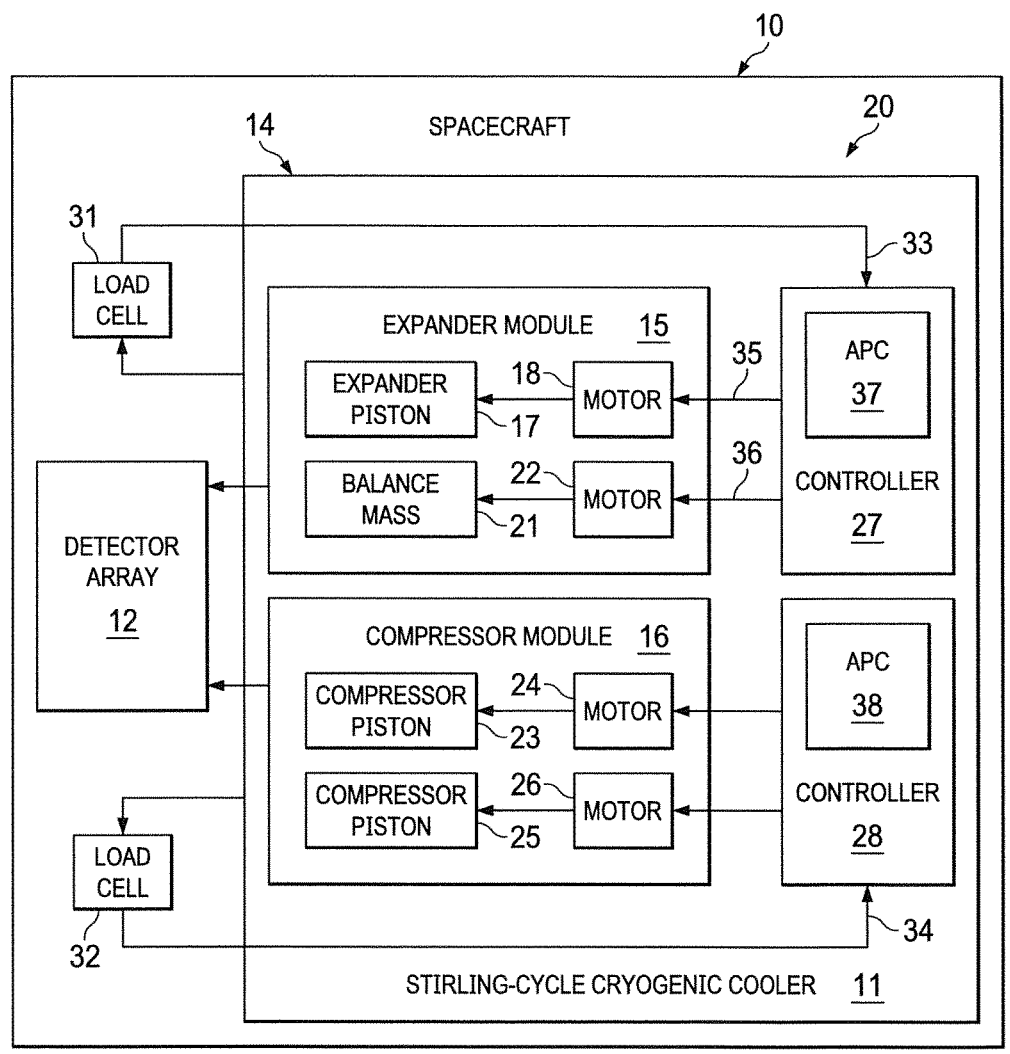
FIGS. 1A and 1B illustrate an example adaptive feed-forward (AFF) vibration control system that implements adaptive phase control (APC) for a cryocooler active vibration cancellation process and related details according to this disclosure.
Figure 1B:
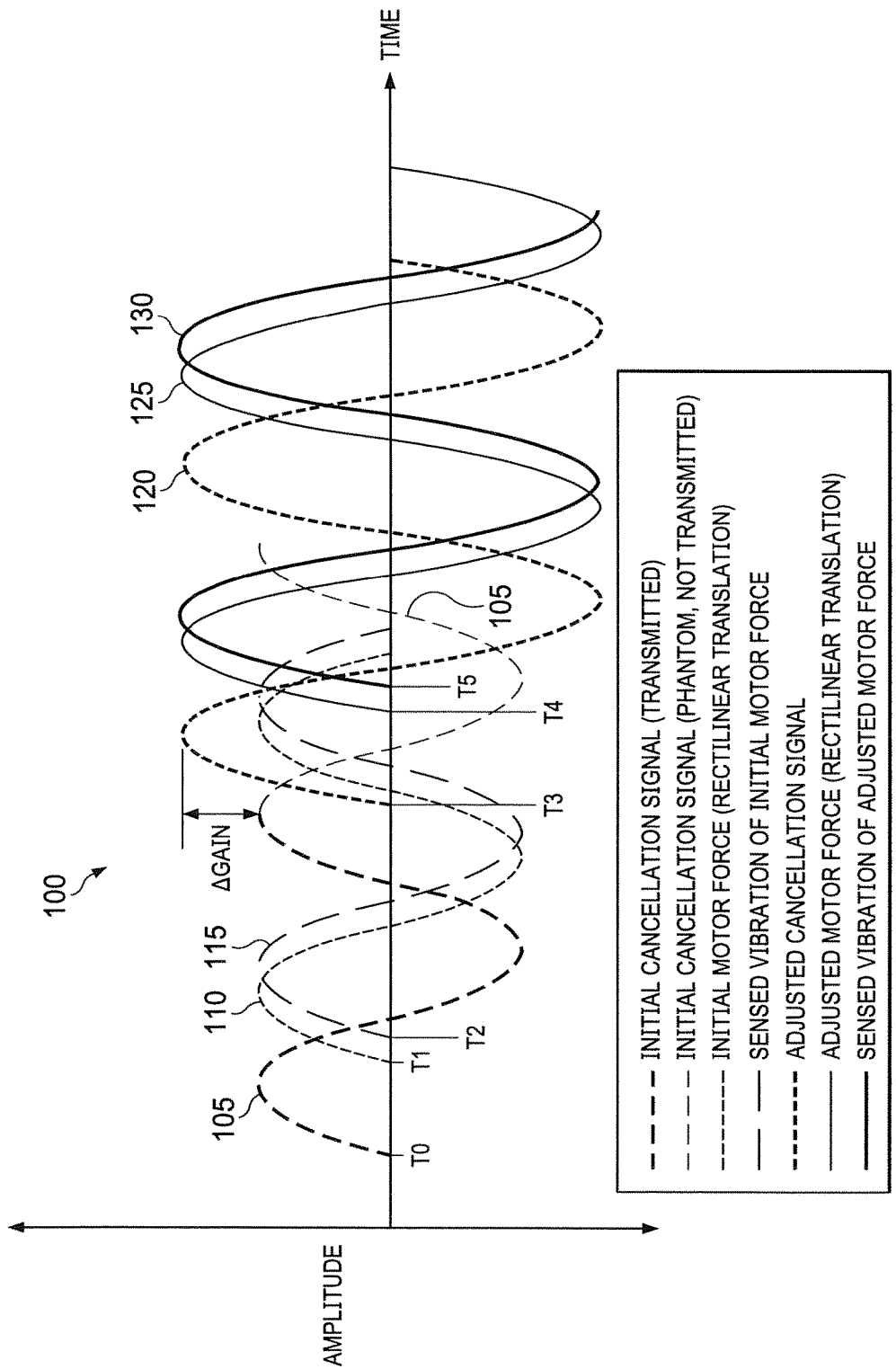

FIGS. 1A and 1B illustrate an example adaptive feed-forward (AFF) vibration control system 20 that implements adaptive phase control (APC) for a cryocooler active vibration cancellation process and related details according to this disclosure. In this example, the control system 20 is used in a spacecraft 10, although the system 20 could be used in any other suitable environment.

As shown in FIG. 1A, the control system 20 includes a Stirling-cycle cryogenic cooler 11, an imaging sensor 12 (also referred to as a detector array) coupled to a cold tip of the cooler 11, and load cells 31 and 32 coupled to the cooler 11. The control system 20 also includes one or more controllers providing APC of a cryocooler active vibration cancellation process.

The cryogenic cooler 11 includes a cooler housing 14, an expander module 15 and a compressor module 16 disposed in the cooler housing 14, a controller 27 for the expander module 15, and a controller 28 for the compressor module 16. Examples of cryogenic coolers include: a Stirling cycle cryocooler, Pulse Tube cryocooler, and a Stirling/Pulse Tube hybrid cryocooler. In some embodiments, the controllers 27-28 are encased within the cooler housing 14 or are coupled to the cooler 11, such as by at least one communication link.

The expander module 15 includes an expander piston 17, a drive motor 18 for the expander piston 17, a balancer mass 21 for the expander module 15, and a drive motor 22 for the balancer mass 21. The expander module is connected to the compressor module by a gas (e.g., helium) transfer line.

The compressor module 16 includes a two compressor pistons 23 and 25, a drive motor 24 and 26 for the each respective compressor piston. The drive motors can include linear motors on the same shaft as the compressor piston. The drive motors 24 and 26 drive the two compressor pistons 23 and 25 in matched opposing linear motion using sinusoidal command signals, such that the compressor pistons' 23 and 25 motions are complimentary. The complimentary motion causes the compressor pistons 23 and 25 to balance each other, and nearly all of the vibration forces generated by the individual pistons are canceled at the housing 14. The compressor pistons 23 and 25 compress a volume of gas contained between them. Each piston moves inside a cylinder with non-contacting clearance seals that allow gas compression without friction between surfaces. The gas is forced out of the compressor and into the expander via the gas transfer line. Perfectly matched pistons and motor drives would completely nullify the vibration at the fundamental motor drive frequency. However, without an adaptive feed forward vibration control, minute differences between the compressor pistons 23 and 25 generate some residual fundamental and higher harmonic forces. Note that while the cooler 11 is described here as a closed-system split-cycle Sterling cryocooler, other types of cryocoolers or other types of machinery that generate vibration forces could be used. The cooler 11 cools the imaging sensor 12 (or other device that benefits from cryogenic cooling) to a target steady-state temperature, such as about 5K to 100K.

The expander module 15 and the compressor module 16 are coupled to respective controllers 27-28. The controllers 27-28 control the temperature to which the cryocooler cools by generating a motor drive signal. In addition to generating the motor drive signal to controlling cooling, the controllers 27-28 control the adaptive feed-forward vibration control system 20 by generating a cancellation signal. The motor drive signal and/or cancellation signal can be generalized as a command signal 35-36 from the controllers 27-28. That is, the command signal 35-36 from the controller to the motor can include the motor drive signal, the AFF cancellation signal, or both. For example, each controller 27-28 can implement an AFF vibration control procedure. The controller 27 for the expander module 15 provides motor drive signals and AFF cancellation signals to the drive motors 18 and 22, and the controller 28 for the compressor module 16 provides motor drive signals and AFF cancellation signals to the drive motors 24 and 26. The controllers 27-28 can be implemented as a single controller or control system that controls all drive motors 18, 22-26. Each controller 27-28 includes executable instructions stored in a machine-usable, computer-usable, or computer-readable medium in any of a variety of forms, where the instructions when executed cause the controller's processing circuitry to perform AFF vibration control and cancellation. The controllers 27-28 can include microprocessor memory, such as a random access memory (RAM) that store data. The memory can store data and instructions for use by the processor.

When implementing the AFF vibration control procedure, the controllers 27-28 iteratively generate cancellation signals that counteract minor piston imbalances at the fundamental drive frequency and higher harmonics of the drive frequency forces generated by the moving components of the cryocooler 11. For each iteration, the AFF vibration control procedure provides an analysis of the magnitude and phase of the vibration harmonics, and generates a cancellation signal having a waveform used to partially cancel those vibrations. The waveforms of the cancellation signal and the motor drive signal are used to control the piston. The controllers 27-28 can store the cancellation signal in the form of data points in RAM and can initialize the data points to all zero values. For example the controllers 27-28 determine Fourier coefficients for each harmonic, such as one pair of sine and cosine reference waveforms stored in RA for each harmonic. Each reference waveform is multiplied by a vibration waveform to calculate a Fourier coefficient (including sine component $B_n$ and cosine component $C_n$). For each harmonic, one pair of sine and cosine synthesis waveforms stored in RAM is shifted in phase to match the phase delay from the motor drive input to the force transducer at that frequency. The AFF cancellation signal waveform is created by multiplying each Fourier coefficient by a corresponding synthesis waveform and gain term. In advancing to a next iteration, controllers 27-28 add the waveform of a new AFF cancellation signal to a previous AFF cancellation signal waveform. The controllers 27-28 add the synthesized cancellation signal waveform to the preceding AFF cancellation signal waveform, so the amount of cancellation increases with each iteration and the amount of vibration decreases. Each iteration builds on the previous cancellation waveform until the vibration is canceled down to the resolution limits of the vibration feedback and the motor dive commands. When the controllers 27-28 select a gain term which gives approximately 10-25% attenuation of vibration, convergence time is slowed, but a higher tolerance for variations in system response is achieved. The lowest vibration achievable within resolution limits of the cryocooler's 11 structure occurs when the AFF converges. Better tuning of the gain term yields faster convergence and greater stability of harmonic levels.

In certain embodiments the AFF cancellation signal is added to the motor drive signal prior to output by a motor drive amplifier. In certain embodiments, the AFF cancellation signal is used to drive a Trim Coil without being combined with the drive signal. The Trim Coil is a separate coil wound onto the same bobbin as the drive motor on a piston. The Trim Coil allows force to be applied to a piston at a finer resolution than the motor drive can achieve.

In the case of a Pulse Tube cryocooler, as there are no moving parts in the expander module (which is a passive resonant cavity called the pulse tube), the controller 27 does not implement the AFF vibration control procedure, only the controller 28 for the compressor module implements the AFF vibration control procedure.

In the case of a Stirling cryocooler or Stirling/Pulse Tube Hybrid cryocooler, the expander module includes an active expander piston that provides an expansion capability to manipulate the phase of the expansion relative to the compressor pressure wave to the optimum operating point, which proves greater efficiency. The structure of the active expander piston precludes being paired with another expander. To balance the forces, the motor 22 drives the balance mass 21 in opposing motion to the expander piston 17 using a command signal having a sinusoidal waveform. The expander allows the gas to expand, absorbing heat from the cold tip at the end of the expander module, which provides the desired cooling action. All of the pistons are driving at the same frequency (for example in a range 20 Hz to more than 100 Hz).

The following is a description of the controller 27 controlling the expander module 15, but an analogous description applies to the controller 28 controlling the compressor module 16. During operation, the controller 27 generates and transmits a command signal 35-36 to an input terminal of the motor 18, 22. In response to receiving the command signal 35-36, the motor 18, 22 generates a linear motion at a motor drive frequency (also referred to as fundamental frequency) that drives the pistons 17, 21 to follow a single-frequency sinusoidal motion. For example, the single-frequency sinusoidal motion can be the same as the fundamental frequency. The controller 27 generates the command signal 35-36 that causes complete cancellation of the fundamental drive frequency vibration force $\Delta F_f$. That is, the vibration forces from the moving pistons that are associated with the fundamental frequency can be cancelled by adjusting the fundamental frequency of the command signal 35-36.

The load cell 31 is coupled between the housing 14 and the controller 27 and provides feedback signals 33 (also referred to as sensed vibration signals) to the controller 27. The load cell 32 is coupled between the housing 14 and the controller 28 and provides feedback signals 34 to the controller 28. Each load cell 31-32 is mounted to the housing 14 and includes a vibration sensor (such as piezoelectric force transducers) to generate feedback signals 33-34 that indicate the vibration present in the housing 14. For example, the load cell 3 measures samples of vibration data at the motor drive frequency at 360 points per cycle. The data rate is selected to have sufficient resolution for the highest harmonic frequency being cancelled. The load cells 31-32 sense a total reaction force $\Delta F$ action on the housing 14, which includes a vibration force $\Delta F_f$ occurring at the fundamental frequency generated by the pistons 17, 21 following the single-frequency sinusoidal motion at the fundamental frequency. In the total reaction force $\Delta F$, the load cells 31-32 sense the residual higher-order harmonic forces, namely the vibrational force $\Delta F_h$. Based on the feedback signals 33 from the load cell 31, the controller 27 adjusts the amplitude α of the command signal 35-36 to balance or reduce to the fundamental drive frequency vibration force $\Delta F_f$ to substantially zero (except for some residual fundamental vibration force) such that the total reaction force $\Delta F=\Delta F_h$.

In addition to vibration forces from the motion of the pistons 17, 23, 25 and the balance mass 21, the cooler 11 includes motor drive electronics, piston suspension flexures, and gas thermodynamics that generate nonlinear forces. For example, the cooler 11 can be filled with helium gas, which effectuates a gas spring. As another example, mechanical resonances of the system 20 generate nonlinear vibration forces within the cooler 11. Additionally, nonlinear interactions between the motion of the cryocooler pistons 17, 21, 23, 25 and the suspension flexures that suspend the pistons cause nonlinear vibration forces within the cooler 11.

Adjustments to the fundamental frequency of the command signal 35-36 applied to the drive motor 18, 22 may not cancel the vibration forces $\Delta F_h$ associated with harmonics of the fundamental frequency, which are generated by nonlinear forces associated with the motor drive electronics, piston suspension flexures, gas spring thermodynamics, mechanical resonances, and the like. Also, adjustments in the amplitude α of the command signal 35-36 that cancel the fundamental drive frequency vibration force $\Delta F_f$ may not cancel vibrations forces $\Delta F_h$ associated with higher harmonics of the fundamental frequency. This is true even in a hypothetical example—when a perfect sine wave command signal is applied to the motor 18, 22 where any adjustment to the perfect sine wave command signal 35-36 is slight in order to counteract mass imbalance or misalignment of pistons 17, 21, the fundamental drive frequency vibration force $\Delta F_f$ could be perfectly cancelled out. That is, for example, if a motorized driver frequency is perfectly 45 Hz, the resultant vibration at the cryocooler case could be zero, but the second harmonic at 90 Hz would exhibit nonlinear vibration due to nonlinear forces of the suspension flexures and gas spring thermodynamics.

The controllers 27-28 respectively include adaptive phase control (APC) modules 37-38 that implement an APC algorithm of the cryocooler active vibration cancellation process. For example, each APC module 37-38 could include executable instructions stored in a machine-usable, computer-usable, or computer-readable medium in any of a variety of forms, where the instructions when executed cause processing circuitry of the controller 27-28 to perform APC of cryocooler active vibration cancellation. In some embodiments, each module 37-38 includes processing circuitry to perform APC and is coupled to transmit a phase command including MPDO values to the respective AFF controller 27-28. The APC modules 37-38 cancel vibration forces $\Delta F_h$ associated with multiple harmonics (such as $1^{st}$, $2^{nd}$, $3^{rd}$ and $N^{th}$ harmonics) of the fundamental frequency. More particularly, the APC modules 37-38 can cancel vibration forces associated with nonlinear forces of the motor drive electronics, piston suspension flexures, gas spring thermodynamics, mechanical resonances, and the like.

The APC module 37 enables the AFF controller 27 to automatically adapt the phase angle φ of the command signal 35-36 supplied to the motor 18, 22 in order to cancel residual harmonic vibration forces $\Delta F_h$. The APC module 37 automatically determines the optimum angle that can provide desired cryocooler active vibration cancellation regardless of the starting transfer function. That is, the APC module 37 generates MPDO values for the AFF controller 27, where the MPDO values indicate the phase angle φ of the command signal 35,36. That is, the MPDO values set the phase angle φ at which the selected motor is driven. The APC module 37 determines a transfer function to represent the relationship between an input to the AFF system 20, namely the command signal 35-36, and an output from the AFF system 20, namely the sensed vibration signal 33-34. The description of FIG. 1B below more particularly describes that, as the transfer function changes, the APC module 37 enables the AFF controller 27 to track the changes of the transfer function throughout time.

The transfer function of the AFF system 20 changes in response to physical phenomena. Example physical phenomena include a change of orientation of the cooler 11 with reference to the ground, a change in temperature within the cryocooler (such as a reduction from ambient temperature to a very cold temperature at the cryocooler's cold-tip), or other physical phenomena. The APC module 37 automatically determines correct Mechanical Phase Delay Offset (MPDO) values needed to implement the AFF vibration cancellation algorithm autonomously. The APC algorithm enables the AFF controller 27 to generate command signals 35-36 that more effectively cancel vibration during the cool-down profile of the cooler 11 by adjusting the MPDO values as needed during operation. The APC module 37 executes an APC algorithm that reduces time and cost associated with integration and testing of a cryocooler and allows the cryocooler to be remotely retuned after delivery. For example, the APC modules 37-38 reduce vibrations at each of the multiple frequencies by adjusting MPDO for each frequency within the multiple harmonics (e.g., $1^{st}$, $2^{nd}$, $3^{rd}$ and $N^{th}$ harmonics). As a nonlimiting example, if the initial motor force's fundamental frequency is 50 Hz, with harmonics at 100 Hz, 150 Hz, 200 Hz, . . . Nx50 Hz, the APC module adjusts MPDO of the fixed frequency waveforms.

Note that the APC module 38 can perform similar functions for the AFF controller 28. In this way, the APC modules 37-38 can help to significantly improve the performance of the cryocooler active vibration cancellation process.

FIG. 1B illustrates an example of a simplified timing diagram 100 of a cancellation signal output from an AFF control system, a single-frequency sinusoidal motion driven by a motor receiving the command signal, and an output signal from a force sensor sensing the vibrations generated by the sinusoidal motion. The waveforms shown in FIG. 1B are provided merely as examples.

The cooler 11 begins operation prior to the time $t_0$, which is before the AFF vibration control procedure begins. At the time $t_0$, the AFF system 20 transmits an initial cancellation signal (shown as first waveform 105) to a selected motor of the cooler. The initial cancellation signal is an example of the command signal 35-36 of FIG. 1A. The initial command signal indicates an initial linear translational frequency and initial magnitude to a selected motor 18, 22, 24, 26. At the time $t_1$, in response to receiving the initial cancellation signal 105, the selected motor linearly moves at the initial motor drive fundamental frequency and initial magnitude. A second waveform 110 represents the single-frequency sinusoidal motion of the piston driven by the linear motion of the selected motor at the initial motor drive fundamental frequency and initial magnitude. At time $t_2$, load cells 31-32 sense vibrations caused by the linear motion of and driven by the selected motor. The sensed vibrations feedback signal 33-34 is shown as a third waveform 115.

The AFF system 20 continuously monitors the vibration forces sensed by the load cells 31-32 and modifies the feed-forward cancellation signal 35-36 transmitted to the selected motor to reduce vibration forces ΔF associated with the initial cancellation signal (first waveform 105). The AFF system 20 generates an adjusted cancellation signal (shown as a fourth waveform 120) based on the vibration forces sensed between times $t_2$ and $t_3$. The adjusted cancellation signal is another example of the command signal 35-36 of FIG. 1A.

An AFF controller 27-28 continues to transmit the initial cancellation signal 105 until time $t_3$, when the controller 27-28 transmits the adjusted command signal (the fourth waveform 120) to the selected motor. Beyond time $t_3$, the first waveform 105 continues as a dashed line to illustrate that the AFF controller 27-28 has stopped transmitting the initial command signal at time $t_3$. The adjusted cancellation signal 120 indicates an adjusted linear translational magnitude and MPDO value (for example, phase angle) sent to the selected motor. At time $t_4$, in response to receiving the adjusted cancellation signal, the selected motor moves at the adjusted linear translational magnitude and phase delay corresponding to the MPDO value, applying an adjusted motor force 125 to the pistons. The second waveform 110 stops at time $t_4$, indicating that the selected motor stopped applying the initial motor force (caused by the first waveform 105) and began applying the adjusted motor force 125 (caused by the fourth waveform 120). A fifth waveform 125 represents the single-frequency sinusoidal motion of the piston driven by the linear motion of the selected motor at the adjusted linear translational magnitude and phase delay corresponding to the MPDO value. At time $t_5$, the load cells 31-32 sense vibrations (shown as a sixth waveform 130) caused by the linear motion of the selected motor moving in response to receiving the adjusted cancellation signal 120. The AFF system 20 continuously monitors the vibration forces sensed by the load cells 31-32 to modify the feed-forward command signal 35-36 transmitted to the selected motor to reduce vibration forces ΔF associated with the adjusted command signal. The third waveform 115 stops at time $t_5$, indicating that the load cells 31-32 stopped sensing the vibrations associated with the initial motor force and began sensing the vibrations associated with the adjusted motor force.

A transfer function can be defined to represent the relationship between an input signal (such as command signal waveform 105 or 120) to the motor and an output signal (such as sensed vibration 115 or 130) of the load cells 31-32. The transfer function represents differences (such as gain) between the input and output signal amplitudes. The transfer function also represents differences (such as phase delay) between the input and output signal phase angles. More particularly, the input signal is transmitted from the AFF system, namely the mechanical and electrical systems that drive the cryocooler; the linear motion of the cryocooler motor is a response to the input signal; and the output signal is transmitted from one or more load cells. Accordingly, the transfer function represents amplitude gain, and phase delays within the mechanical and electrical systems that drive the cryocooler, the cryocooler itself, and the mechanical and electrical systems that the cryocooler operates within. A Bode plot of the transfer function characterizes the phase delay and gain as functions of frequency for the mechanical and electrical systems that drive the cryocooler and the mechanical and electrical systems that the cryocooler runs within.

Each transfer function can include first, second, and third phase delays. For example, a first phase delay $t_1-t_0$ between waveforms 105 and 110 represents the amount of time between time $t_1$ at which the electrical components of the motor receive initial command signals (assuming the AFF system 20 transmits the initial cancellation signal to the motor at time $t_0$) and time $t_1$ at which the mechanical components of the motor linearly move at the initial motor drive fundamental frequency. A second phase delay $t_2$–$t_1$ between waveforms 110 and 115 represents the amount of time between time $t_1$ and time $t_2$ at which the load cells sense the vibrations of the motor moving at the initial motor drive fundamental frequency (assuming the AFF system receives the signal generated by the load cells at the same time $t_2$). A third phase delay $t_2$–$t_0$ between waveforms 105 and 115 represents the amount of time between the time the AFF system 20 transmits the initial cancellation signal to the motor at time $t_0$ and the time $t_2$ that the AFF system 20 receives the signals generated by the load cells sensing the motor moving linearly at the initial motor drive fundamental frequency. As the third phase delay is a sum of the first and second phase delays, the length of the third delay depends on the length of the second phase delay. The third phase delay can be referred to as a Mechanical Phase Delay and is also referred to as the Transfer Function Phase Delay.

Upon application of an adjusted cancellation signal 120, the cooler 11 responds transiently to the differences between the initial command signal (waveform 105) and the adjusted cancellation signal (waveform 120). The transient response begins when the AFF controller 27-28 stops transmitting the initial cancellation signal 105 just before time $t_3$. Before the AFF controller 27-28 applies the adjusted cancellation signal 120 to the motor, an initial MPDO equal to zero is effective, which corresponds to the initial cancellation signal waveform 105 as the input and the vibration waveform 115 as the output. During the transient response, the AFF system 20 changes from the initial MPDO to an adjusted MPDO (input waveform 120 and output waveform 130). The transient response ends when the adjusted MPDO is effective. The APC module 37-38 determines the initial MPDO and adjusted MPDO for times of steady state operation. That is, a physical transfer function is intrinsic to the control system 20. The APC algorithm measures that physical transfer function by monitoring each iteration of the AFF algorithm. The APC module 37-38 determines the physical transfer function intrinsic to the control system 20 based on the relationship between the input waveform of the cancellation signal and the output waveform of the sensed vibration. That is, the relationship between the cancellation signal 105 and the sensed vibration 115 (also for example, the relationship between the cancellation signal 120 and the sensed vibration 130) is a basis for determining the physical transfer function intrinsic to the control system 20. In certain embodiments, the APC module 37-38 waits a certain length of time (for example, a transient response settling period) between applying a subsequent adjustment to the waveforms and updating MPDO values based on the measured effects from application of the current adjusted cancellation signal 120.

Upon application of an adjusted cancellation signal 120 at time $t_3$, the difference between the initial MPDO value and the adjusted MPDO value generates a phase delay between the waveforms 110 and 125. The APC module 37-38 automatically (without human intervention) updates and modifies the MPDO values based on the measured transfer function to represent the adjustment of the feed-forward cancellation signal (from waveform 105 to 120), including the phase delay between the input (waveform 120 at time $t_3$) and the output (waveform 130 at time $t_5$). The APC module 37-38 automatically generates a MPDO values indicating the MPDO values using the measured transfer function and provides the MPDO values within the command signal 35-36 to cancel the forces associated with application of the adjusted cancellation signal 120 as sensed by the load cells 31-32. That is, the next iteration of an AFF algorithm includes the updated MPDO values in the next adjusted cancellation signal (i.e., the cancellation signal after waveform 120).

Note that in FIG. 1A, the cooler 11 is shown as a component of a spacecraft 10. However, this disclosure is not limited to spacecraft systems. The cooler 11 can be a component of any type of system that benefits from cryogenic cooling, such as another vehicle system, a panel top of a laboratory test bench, and the like. The type of system that includes the cooler 11 affects the length of the delay between the time the effect of the adjusted feed-forward cancellation signal takes place and the time the load cells 31-32 sense the resulting vibration at the housing 14. The type of system that includes the cooler 11 also affects the length of the delay between the time the adjusted feed-forward cancellation signal is supplied to the motorized driver (time $t_3$) and the time the effect of the adjusted cancellation signal takes place (time $t_4$).

By comparison, an AFF that does not include an APC module does not characterize and correct for transfer functions. One solution for modifying the vibration cancellation algorithm of an AFF without APC includes empirically determining MPDO values, which coarsely tunes the AFF cancellation signal. However, empirically determining the MPDO values is a time-consuming endeavor, and values need to be determined for all operating temperatures and mounting conditions of the cryocooler.

FIG. 2 illustrates example magnitudes of vibration harmonics versus frequency for an AFF controller that does not include an APC module according to this disclosure. A graphical representation 200 provides results from an example AFF operation within the cancelled signal frequency domain for a single sample of data. Other AFF operation results can be represented graphically without departing from the scope of this disclosure.

The graphical representation 200 displays vibration force magnitudes for nine harmonics of a fundamental frequency. A first spike 210 in magnitude represents the first harmonic of the fundamental frequency, which corresponds to a fundamental frequency in the range of about 25-27 Hz. That is, the motors 18, 22, 24, 26 drive a single-frequency sinusoidal motion of the pistons 17, 21, 23, 25 at the fundamental frequency. A second spike 220 in magnitude represents the second harmonic of the fundamental frequency, which corresponds to a fundamental frequency in the range of about 50-54 Hz. In this example, the vibration forces at the first harmonic frequency have a greater magnitude than the vibration forces at the second harmonic frequency. The third, fourth, fifth, sixth, seventh, eighth, and ninth spikes 230-290 represent respective ordinal harmonics of the fundamental frequency.

FIG. 3 illustrates example magnitudes of vibration harmonics versus time during AFF operation according to this disclosure. The AFF system 20 is simulated to generate a graphical representation 300 displayed in FIG. 3, which include an 86° Transfer Function Phase Delay. In order to generate the graphical representation 300, a total of at least 100 iterations of magnitudes of vibration harmonics versus frequency graphical representations can be plotted similar to the plots in the graphical representation 200. The graphical representation 300 provides results from the same AFF operation as shown in FIG. 2 for 100 samples of data. As an example, a single sample of data can include data measured for a one-second duration of time or include instantaneous data measured every second. Although this disclosure describes samples of data measured every second, other intervals of time can be used. The time domain in FIG. 3 spans 100 seconds. During the 100 seconds displayed, an adjusted cancellation signal is applied to one or more motors to reduce the magnitude of the spike 210.

The graphical representation 300 displays vibration force magnitudes for eight harmonics of the fundamental frequency, specifically the second through ninth harmonics. Each line plot represents a respective one of the second through ninth harmonics. A group 305 of seven of the line plots exhibits a decay of amplitude, which indicates a reduction of vibration forces ΔF. The amplitude decay shows that the adjusted cancellation signal destructively interferes with the cryocooler vibration levels in at least seven of the eight displayed harmonic frequencies.

A line plot 310 shows the behavior of one of the second through ninth harmonics. The line plot 310 includes an incline, which indicates an increase of vibration forces ΔF for a harmonic that is not properly adjusted or tuned. The incline shows that the adjusted cancellation signal constructively interferes with the cryocooler vibration levels at one of the harmonic frequencies. The incline is caused by incorrect phase alignment due to a non-optimal phase value within the adjusted cancellation signal.

FIG. 4 illustrates example phase angles of vibration harmonics versus time during AFF operation according to this disclosure. A graphical representation 400 in FIG. 4 provides results from the same AFF operation as shown in FIG. 2. The time domain spans 100 seconds, and the data is sampled at one sample per second for a total of 100 samples. During the 100 seconds displayed, an adjusted cancellation signal is applied to one or more motors to reduce the magnitude of the first spike 210.

The graphical representation 400 displays vibration force phase angles for the nine harmonics of the fundamental frequency shown in FIG. 2, specifically the first through ninth harmonics. Each line plot represents a respective one of the nine harmonics. Groups 405a-405b having eight of the line plots exhibit flat lines, which indicates constant phase angle values throughout time. The constant phase angle values show that the adjusted cancellation signal generates stability in the phase angle for eight of the nine displayed harmonic frequencies.

A line plot 410 shows the behavior of one of the nine harmonics. The line plot 410 includes an incline, which indicates an increase in phase angle for a harmonic that is not properly adjusted or tuned. The incline shows that the adjusted cancellation signal constructively interferes with the cryocooler vibration levels at one of the nine displayed harmonic frequencies. The linear increase in phase, shown by the inclined line, is caused by incorrect phase alignment due to a non-optimal phase value within the adjusted cancellation signal.

Various embodiments of this disclosure include an APC module 37-38 that acquires information during execution of the AFF vibration cancellation process and determines whether the MPDO needs to be adjusted based on the response of the cryocooler to a cancellation signal (such as an adjusted cancellation signal) sent from the AFF controller 27-28. By monitoring the magnitudes of the cancellation signal over time, the APC module 37-38 makes a determination whether the cancellation signal being sent to the cooler is destructively (preferably) or constructively (undesirably) interfering with the cryocooler vibration levels. By monitoring how the phase cancellation changes with time, the APC module 37-38 makes a determination whether the cancellation signal is leading or lagging the actual vibration levels. Based on this information, the APC module 37-38 makes a determination whether an adjustment to the MPDO value is needed to correct the MPDO value into the required range needed for the AFF algorithm to substantially cancel vibrations. The APC module 37-38 can determine the MPDO value based on monitoring the change in phase angle of the calculated cancellation signal (i.e., using different inputs to measure the same thing).

Figure 5:
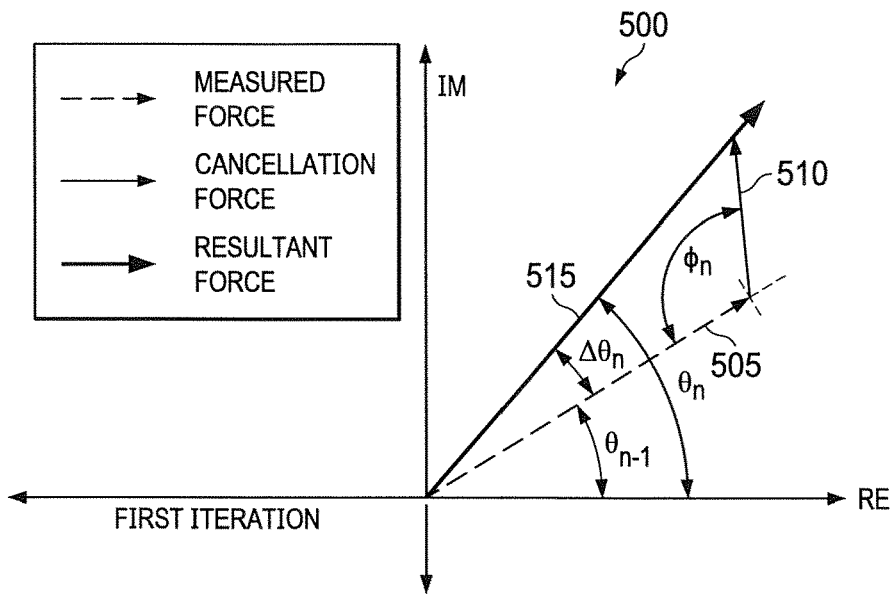
FIGS. 5 and 6A illustrate example phasor representations of iterations of determining a Mechanical Phase Delay Offset (MPDO) values according to this disclosure.
Figure 6A:
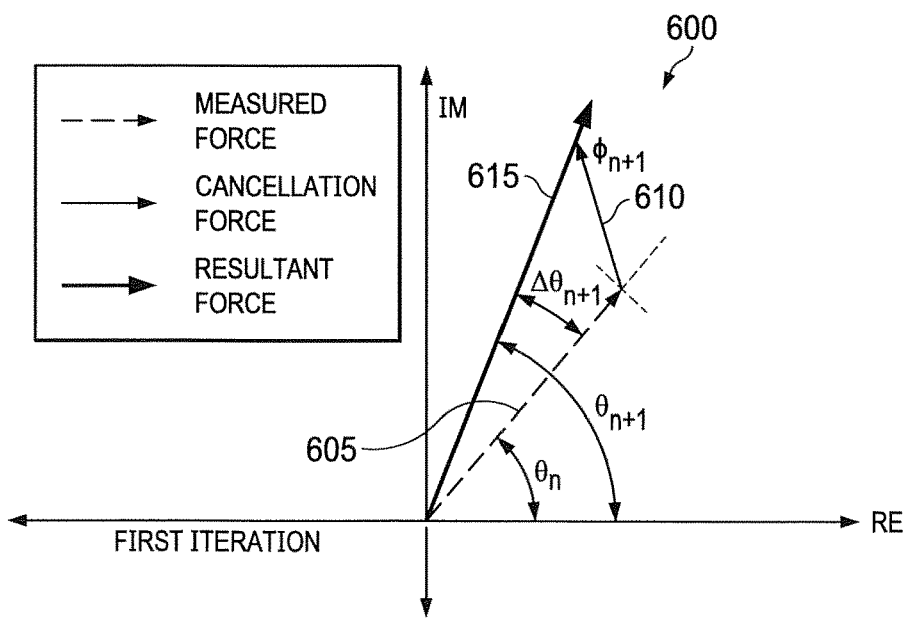

FIGS. 5 and 6A illustrate example phasor representations 500, 600 of iterations of determining a MPDO values according to this disclosure. The same single harmonic frequency applies to FIGS. 5 and 6A. The phasor representations 500, 600 correspond to the first and second of a number N of iterations for determining a MPDO values as part of the APC for a cryocooler active vibration cancellation process. The phasor representations 500, 600 are plotted in a complex plane {Real, Imaginary}. The magnitudes of the phasor representations 500, 600 are not shown to scale in order to illustrate the phase relationships between the vectors. The axes of FIG. 5 are not on the same scale as the axes of FIG. 6A. In the examples shown in FIGS. 5 and 6A, the magnitude of each vector increases during each iteration.

Each phasor representation 500, 600 represents (for a single frequency) one sample of vibration for data, including amplitude and phase angle for each of: a measured vibration force, a cancellation force, and a resultant force. One sample of vibration data may include, for several frequencies, amplitude and phase angle for the measured vibration, cancellation, and resultant forces, but the phasor representations 500, 600 of FIGS. 5 and 6A illustrate only one frequency (a single harmonic frequency). The phasor representations 500, 600 plot coordinate points of sine waveforms corresponding to a measured force, cancellation force, and resultant force. The following is a description of determining the MPDO values for a single harmonic frequency, but it is understood that an analogous description applies for determining the MPDO values for each of the harmonic frequencies.

FIG. 5 illustrates the phasor representation 500 of the first iteration of determining the MPDO values. Before time $t_0$, the cooler 11 commences operation, and the load cell 31-32 measures the vibration force upon startup $\Delta F(t_0)$ (also referred to as the total reaction force), which is transduced to a sensed vibration signal 33-34 (such as waveform 115 in FIG. 1B) fed back to the controller 27-28. Before time $t_0$, the AFF controller 27-28 does not send a cancellation signal (or the waveform 105 up to time $t_0$ has zero amplitude and no harmonic content). The measured vibration force upon startup $\Delta F(t_0)$ is generated by an initial command signal (including a zero value cancellation signal or not including a cancellation signal) including a motor drive signal, which does not include vibration cancellation adjustments. The measured vibration force upon startup $\Delta F(t_0)$ includes vibrational forces generated by nonlinear interactions within the cooler 11, the single-frequency sinusoidal motion of the pistons 17, 21, 23, 25, and the linear motion of the motors 18, 22, 24, 26.

A measured force vector 505 is a phasor representation of the measured vibration force upon startup $\Delta F(t_0)$ for a single harmonic frequency, and $\theta_{n-1}$ is the phase angle of the measured force upon startup. The suffix for the phase angle includes a lowercase "n" that represents the ordinal count for the respective iteration. The count is n=1 for the first iteration, n=2 for the second iteration, and so on. However, n has the same value in FIGS. 5 and 6A because the second iteration is drawn in reference to the first iteration.

The AFF controller 27-28 monitors the vibration forces sensed by the load cell 31-32 over time and calculates a cancellation force to substantially cancel the measured vibration force upon startup $\Delta F(t_0)$ for the first harmonic fundamental frequency. For example, without using the APC module 37-38, the AFF controller 27-28 adjusts the amplitude $\alpha$ and phase of the motor drive command signal 35-36 corresponding to the calculated cancellation force to balance or reduce the fundamental drive frequency vibration force $\Delta F_f$ to zero such that the total reaction force $\Delta F(t) = \Delta F_h$. That is, at time $t_3$, the AFF controller 27-28 transmits an adjusted cancellation signal (such as waveform 120 in FIG. 1B) to the selected motor(s) 18, 22, 24, 26.

A cancellation force vector 510 is a phasor representation of the cancellation force when the adjusted cancellation signal is applied to the AFF system 20 for a single harmonic frequency. The phase angle $\varphi_n$ of the cancellation force is measured relative to the measured force vector 505. The suffix for the phase angle again includes a lowercase "n" that represents the ordinal count for the respective iteration. The load cell 31-32 measures the resultant total reaction force $\Delta F(t_3)$, which is transduced to a sensed vibration signal 33-34 (such as waveform 130 in FIG. 1B) fed back to the APC module 37-38 of the controller 27-28. The resultant force $\Delta F(t_3)$ is a combination of the measured vibration force upon startup $\Delta F(t_0)$ and the actual cancellation force. For simplification of explanation, it will be assumed that the actual cancellation force is equal to the calculated cancellation force.

A resultant force vector 515 is a phasor representation of the resultant force $\Delta F(t_3)$ for a single harmonic frequency, and $\theta_n$ is the phase angle of the resultant force. The resultant force vector 515 is a vector sum of the measured force vector 505 and the cancellation force vector 510. The vector sum expresses that, when the sine waves of the measured force at start up $\Delta F(t_0)$ and cancellation force are combined, the load cells 31-32 sense a different sinusoidal motion within the cooler 11, such as the waveform 130 of FIG. 1B.

Equations (1)-(3) show that the phase angle $\varphi_n$ of the cancellation force vector 510 is a function of the AFF gain ($G_{AFF}$) and the phase angle $\Delta\theta_n$ between the measured force vector 505 and the resultant force vector 515 (meaning $\varphi_n(\Delta\theta_n, G_{AFF})$). Using trigonometry and geometry and the relationships below, it can be shown that the phase angle difference $\Delta\theta_n$ between the measured force vector 505 and the resultant force vector 515 is a function of the phase angle $\varphi_n$ of the cancellation force vector 510 and $G_{AFF}$.

$$|\text{Cancellation Force}| = G_{AFF} \times |\text{Measured Force}| \quad (1)$$
$$\frac{|\text{Cancellation Force}|}{|\text{Measured Force}|} = G_{AFF}$$
where $0 \le G_{AFF} \le 1$.

$$\Delta\theta_n = \theta_n - \theta_{n-1} \quad (2)$$

$$180° = \Delta\theta_n + \varphi_n + \cot\left(\frac{|\text{Cancellation Force}|}{|\text{Measured Force}|}\right) \quad (3)$$
$$= \Delta\theta_n + \varphi_n + \cot(G_{AFF})$$

The APC module 37-38 controls the phase angle of the cancellation force to equal zero ($\varphi_n = 0$) by adjusting the AFF MPDO based on measurements of $\Delta\theta$. The APC module 37-38 iteratively converges the AFF system 20 to a perfect solution to the AFF system 20, which occurs when $\varphi_n = 0$, which is when the cancellation force vector 510 would be equally opposed to the measured force vector 505, such that the load cell 31-32 would sense zero vibration forces—meaning vector sum of 505 and 510 would be zero. That is, the AFF MPDO controls $\varphi_n$, and the APC module 37-38 iteratively adjusts the AFF MPDO to drive $\varphi_n$ to zero and drive $\Delta\theta$ to zero.

$$\varphi_n = \text{Transfer Function Phase Delay} + \text{AFF MPDO} \quad (4)$$

where Equation (5) results when $\varphi_n = 0$:

$$\text{Transfer Function Phase Delay} = -\text{AFF MPDO} \quad (5)$$

The $G_{AFF}$ is a constant defined by the controller 27-28 as a value between 0 and 1 inclusive. In certain embodiments, a user selects the value of the $G_{AFF}$ and the controller 27-28 receives the user-selected value. In certain embodiments, once defined or selected, the $G_{AFF}$ value is not changed by the APC algorithm or AFF algorithm. To set the value of $G_{AFF}$, the controller 27-28 determines the magnitude and phase angle of the measured vibration force $\Delta F(t)$ for the single harmonic frequency. A zero value for $G_{AFF}$ corresponds to no cancellation force (innumerable iterations). A one value for the $G_{AFF}$ corresponds to a cancellation force that, within one iteration, completely cancels the measured vibration force $\Delta F(t)$ for the single harmonic frequency. The controller 27-28 enables the AFF system 20 to be tolerant of changes in the transfer function by selecting a value for the $G_{AFF}$ that corresponds to a cancellation force that, within a nominal number of iterations, converges the cancellation force to substantially cancel the measured vibration force $\Delta F(t)$ for the single harmonic frequency. For example, the controller 27-28 can set the $G_{AFF}$ to a value selected from the range 0.1 to 0.3, which is a range of values small enough to prevent too many iterations and large enough to prevent limit cycling (toggling between overshooting and undershooting the cancellation force). FIG. 8 shows that the $G_{AFF}$ value causes the cancellation force to gradually (iteration to iteration) reduce the magnitude of the measured vibration force $\Delta F(t)$ for the multiple harmonic frequencies toward a zero value asymptote (the perfect solution).

FIG. 6A illustrates the phasor representation 600 of the second iteration of determining the AFF MPDO. The resultant force vector 515 of the first iteration is renamed and used as the measured force vector 605 of the second iteration. That is, the measurement of the resultant total reaction force $\Delta F(t_3)$ that occurs at the end of the previous (n=1) iteration is the same measurement of the measured vibration force $\Delta F(t_3)$ that occurs at the start of the current (n=2) iteration.

The APC module 37-38 performs a quadrant check function for each iteration by monitoring the magnitude of the measured force vector 505 (|Measured Force|) from iteration to iteration to ensure that $\varphi_n$ converges to zero and not to $\pi$ radians. For example, if the magnitude of the measured force vector 505 for the iteration n (|Measured Force|$_n$) is less than the magnitude of the measured force vector 605 for iteration n+1 (|Measured Force|$_{n+1}$), the APC module 37-38 adds $\pi$ radians to the AFF MPDO for iteration n+1. Values other than $\pi$ radians can be chosen in order to optimize the time of convergence.

When the iteration count is greater than one (n>1), the AFF controller 27-28 transmits an adjusted cancellation signal (such as waveform 120 in FIG. 1B) that includes a signal corresponding to the cancellation force vectors from all the previous iterations. The APC module 37-38 calculates an AFF MPDO so that the AFF algorithm cancellation force vector 610 results in $\Delta\theta_{n+1} < \Delta\theta_n$ and $\varphi_{n+1} < \varphi_n$ and |Cancellation Force|$_n$ < |Cancellation Force|$_{n+1}$.

Figure 6B:
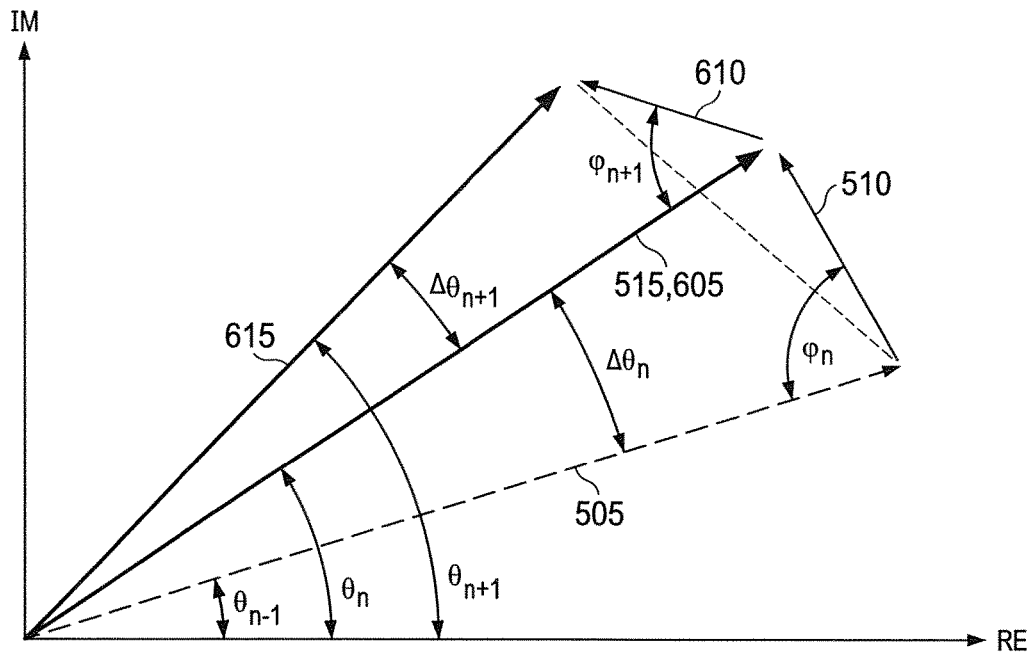
FIG. 6B illustrates a combined phasor representation of the two phasor representations in FIGS. 5 and 6A.

The load cells 31-32 sense and measure the force (represented by the resultant force vector 615) of the sinusoidal motion within the cooler 11 resulting from the linear motion of the motor receiving an adjusted motor drive signal and a cancellation signal (configured to generate the cancellation force of the vector 610). The resultant force vector 615 of the second iteration is the same as the measured force vector of the third iteration. FIG. 6B illustrates a combined phasor representation of the two phasor representations in FIGS. 5 and 6A. As shown, the vector difference between the measured force vector 505 for the first iteration and the resultant force vector 615 for the $n^{th}$ iteration (shown as iteration 2) is equal to the cancellation vector sum 650 of the previous cancellation vectors back to the initial cancellation vector (for example, a zero cancellation previous to the first iteration). In the example shown, the cancellation vector sum 650 is equal to the vector sum of the cancellation force vector 510 plus the cancellation force vector 610. That is, an adjusted cancellation signal 120 causes a cancellation force defined by to the cancellation vector sum 650, namely the sum of the previous cancellation vectors back to the initial cancellation vector.

Figure 7:
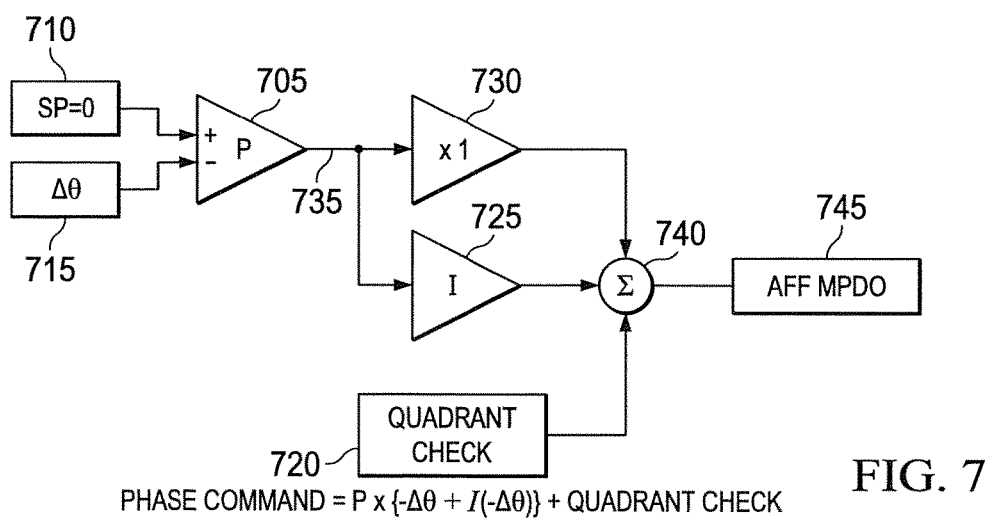
FIG. 7 illustrates an example control diagram of an APC module according to this disclosure.

FIG. 7 illustrates an example control diagram of an APC module 37-38 according to this disclosure. The APC module 37-38 includes an error comparator 705 that determines a difference between a specified setpoint 710 and a measured phase angle difference $\Delta\theta$ input 715. The error comparator 705 amplifies the difference by a gain P, which is set to match the AFF system 20. A quadrant check processing block 720 performs the quadrant check function. For example, the quadrant check processing block 720 outputs $\pi$ radians or 180° if $|\text{Measured Force}|_n \leq |\text{Measured Force}|_{n+1}$. An integrator gain (I) amplifier 725 applies an integrator gain to its input, and a buffer 730 receives the error comparator output 735 ($-\Delta\theta$). A summation block 740 adds outputs from the quadrant check processing block 720, the amplifier 725, and the buffer 730. An AFF MPDO 745 is the output from the summation block 740. The AFF MPDO 745 can be expressed as shown in Equation (6).

$$\text{AFF MPDO} = P \times \{-\Delta\theta + I\!\int(-\Delta\theta)\} + \text{Quadrant Check} \quad (6)$$

FIG. 8 illustrates an example simulation of vibration magnitudes versus time during AFF operation using an APC module 37-38 according to this disclosure. The AFF system 20 is simulated to generate a graphical representation 800 displayed in FIG. 8, which include an 86° Transfer Function Phase Delay. The graphical representation 800 provides results for 100 samples of data. In order to generate the graphical representation 800, a total of at least 100 iterations of magnitudes of vibration harmonics versus frequency graphical representations can be plotted similar to the plots in the graphical representation 200. As an example, a single sample of data can include data measured for a one-second duration of time or include instantaneous data measured every second. The time domain in FIG. 8 spans 100 seconds, beginning at 0 seconds (time $t_0$). The data is sampled at one sample per second for a total of 100 samples for the time interval displayed. During the 100 seconds displayed, an adjusted command signal is applied to one or more motors to reduce the magnitude of the vibrations at each of the multiple harmonic frequencies. Although this disclosure describes samples of data measured every second, other intervals of time can be used without departing from the scope of this disclosure.

The graphical representation 800 displays simulation vibration force magnitudes for nine harmonics of the fundamental frequency, specifically the first through ninth harmonics. Each line plot represents a respective one of the first through ninth harmonics. A group 805 containing all of the line plots exhibits a decay of amplitude, which indicates a reduction of vibration forces $\Delta F$ at every harmonic frequency. The amplitude decay shows that the adjusted cancellation signal destructively interferes with the cryocooler vibration levels at all of the nine displayed harmonic frequencies.

A line plot 810 shows the vibration force magnitude behavior of one of the nine harmonics, where the Transfer Function Phase Delay is 86 degrees. A line plot 815 shows the vibration force magnitude behavior of another of the nine harmonics, where the Transfer Function Phase Delay is 114 degrees. This graphical representation 800 shows that the APC module 37-38 reduces vibration levels for transfer functions that would have been unstable if the APC module 37-38 was not used.

FIG. 9 illustrates an example simulation of vibration phase angles of vibration harmonics versus time during AFF operation according to this disclosure. A graphical representation 900 provides results from the same AFF operation as shown in FIG. 8. The time domain of FIG. 9 is the same as the time domain of FIG. 8. The graphical representation 900 displays vibration force phase angles for the nine harmonics of the fundamental frequency, specifically the first through ninth harmonics. Each line plot represents a respective one of the nine harmonics. Line plots shown exhibit flat lines, which indicate constant phase angle values throughout time. The constant phase angle values show that the adjusted cancellation signal generates stability in the phase angle for the nine harmonics.

The phase angle values of a line plot 910 correspond to the amplitude of the vibration magnitude of the line plot 810. That is, the line plot 910 shows the phase angle behavior of one of the nine harmonics, where the Transfer Function Phase Delay is 86 degrees. The phase angle values of a line plot 915 correspond to the amplitude of the vibration magnitude of the line plot 815. The line plot 915 shows the phase angle behavior of another of the nine harmonics, where the Transfer Function Phase Delay is 114 degrees. This graphical representation 900 shows that the APC module 37-38 reduces the $\Delta\theta$ over time for transfer functions that would have been constant over time if the APC module 37-38 was not used.

FIG. 10 illustrates an example MPDO values versus time using an APC module 37-38 according to this disclosure. A graphical representation 1000 provides results from the same AFF operation as shown in FIG. 8. The time domain of FIG. 10 is the same as the time domain of FIG. 8. The MPDO values of a line plot 1010 correspond to the amplitude of the vibration magnitude of the line plot 810 and to the phase angle values of the line plot 910. That is, the line plot 1010 shows the MPDO values behavior of one of the nine harmonics, where the Transfer Function Phase Delay is 86 degrees. The lack of a spike in the MPDO values shows that the quadrant check module output is zero throughout time. The gradual decay of the line plot 1010 to an asymptote (the perfect solution) exhibits that multiple iterations converge the MPDO values to a value of approximately 1.7 radians.

The AFF MPDO values of a line plot 1015 correspond to the amplitude of the vibration magnitude of the line plot 815 and to the phase angle values of the line plot 915. The line plot 1015 shows the AFF MPDO behavior of another of the nine harmonics, where the Transfer Function Phase Delay is 114 degrees. The spike in the AFF MPDO values shows that the quadrant check module output is a $\pi$ corresponding to a comparison between the first two iterations. That is, the $\varphi_n$ value is flipped by 180° for the first iteration to change the quadrant of the phase $\varphi_n$ value by reversing the positive/negative sign of the phase $\varphi_n$ value. The 180° flip is an example angle used to change the quadrant of the phase $\varphi_n$ value, other angles can be used without departing from the scope of this disclosure.

The MPDO values of a line plot 1020 correspond to the amplitude of the vibration magnitude and the phase angle values of the remaining seven of the nine harmonics plotted in FIGS. 8 through 10 (the seven harmonics that do not correspond to line plots 810, 910 or line plots 815, 915). The graphical representation 1000 shows that the APC module 37-38 converges to a solution for AFF MPDO that is stable for parameters that would be unstable if the APC module 37-38 was not used.

Figure 11:
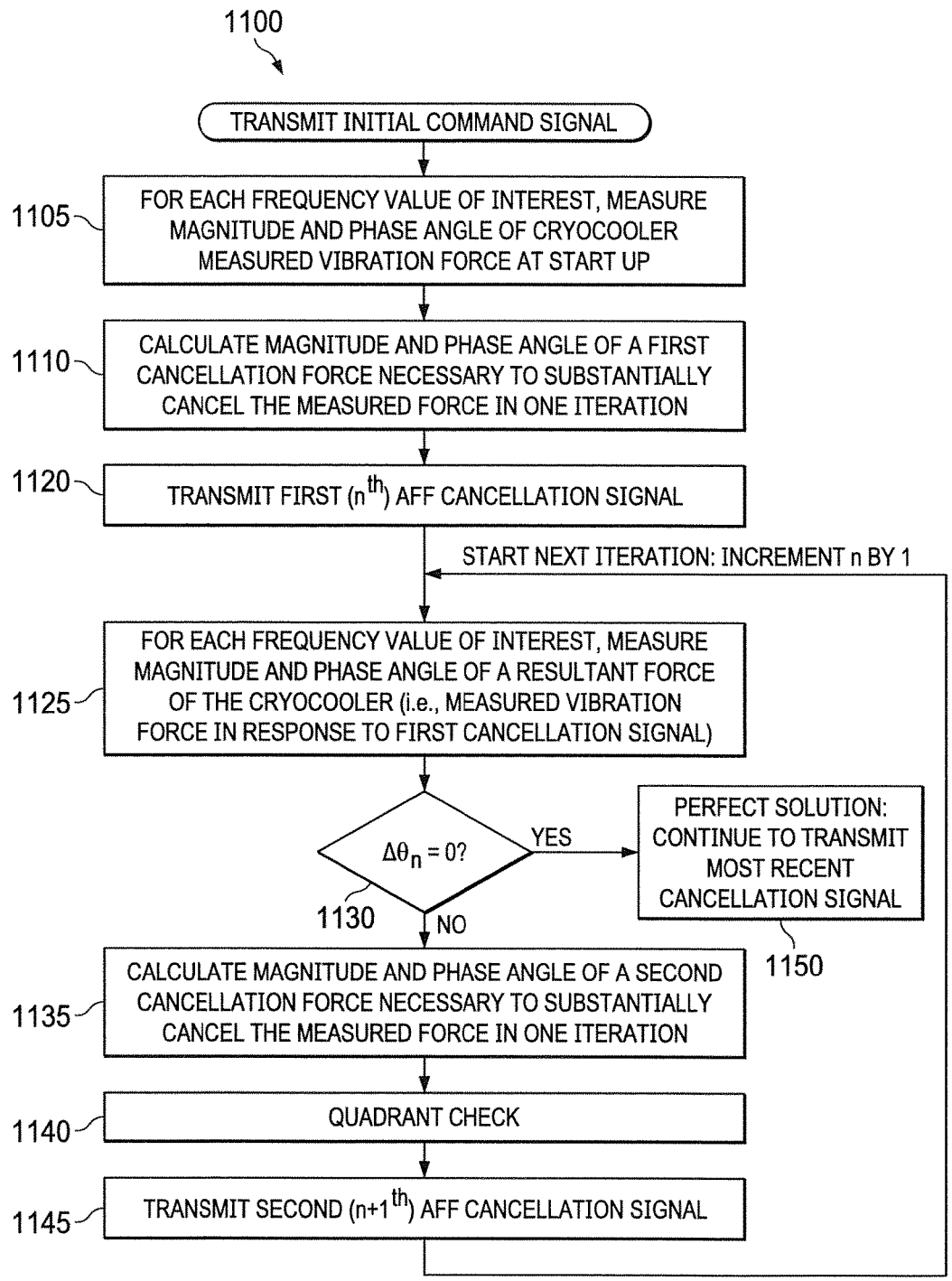
FIG. 11 illustrates an example method for adaptive phase control of a cryogenic cooler active vibration cancellation process according to this disclosure.

FIG. 11 illustrates an example method 1100 for adaptive phase control of a cryogenic cooler active vibration cancellation process according to this disclosure. The embodiment of the method 1100 shown in FIG. 11 is for illustration only. Other embodiments could be used without departing from the scope of this disclosure. The method 1100 can be implemented by the APC module 37-38 or an AFF controller 27-28 including the APC module 37-38 or by any other suitable component(s). The method 1100 can be used to measure the transfer function phase delays of an AFF system 20 or other system.

Each step in FIG. 11 can be executed for each frequency value of interest. The frequency values of interest can include a fundamental frequency and multiple harmonics of the fundamental frequency. For example, if nine harmonics of a fundamental frequency are the nine frequency values of interest, nine measured vibration force vectors, nine cancellation force vectors, and nine resultant force vectors can be determined for each iteration.

In block 1105, the APC module 37-38 measures the magnitude and phase angle of a measured vibration force upon startup $\Delta F(t_0)$, such as for a cooler 11. The measured vibration force upon startup $\Delta F(t_0)$ can be generated by an initial command signal (such as waveform 105 in FIG. 1B), which does not include vibration cancellation adjustments. In block 1110, the APC module 37-38 calculates the magnitude and phase angle of a cancellation force needed to substantially cancel the measured vibration force upon startup $\Delta F(t_0)$. For example, the APC module 37-38 calculates a phasor representation of the cancellation force vector to substantially cancel the first harmonic fundamental frequency in one iteration. Without using the APC module 37-38, the AFF controller 27-28 adjusts the amplitude $\alpha$ of the motor drive command signal 35-36 corresponding to the calculated cancellation force to balance or reduce to the fundamental drive frequency vibration force $\Delta F_f$ to zero. In block 1120, the controller 27-28 transmits a first command signal to at least one selected motor. The first cancellation signal corresponds to the cancellation force vector of a first iteration. For example, the first cancellation signal substantially cancels the fundamental drive frequency vibration force $\Delta F_f$ to zero. In certain embodiments of the present disclosure, the control system 20 is configured to with a definition of zero as a convergence limit value that is small enough to indicate to the APC module that convergence has been reached and to not iterate. For example, the definition of zero could be a substantially zero value. The APC module 37-38 determines the phase angle $\varphi_n$ of the cancellation force vector with respect to the measured vibration force vector of block 1105.

In block 1125, the APC module 37-38 receives the magnitude and phase angle of a resultant vibration force $\Delta F(t_3)$ information from the AFF module. For example, the APC module 37-38 determines a phasor representation of the resultant vibration force that the AFF system 20 generates in response to the first cancellation signal transmitted in block 1120. The APC module 37-38 determines a difference ($\Delta\theta$) between the phase angle of the measured vibration force of block 1105 and the phase angle of the resultant vibration force. In block 1130, the APC module 37-38 determines whether the first cancellation signal caused the resultant vibration force to be substantially cancelled by converging the AO to a perfect solution. If $\Delta\theta=0$, in block 1150, a substantially perfect solution was reached, and the controller 27-28 continues to transmit the first cancellation signal. If $\Delta\theta\neq 0$, the controller 27-28 proceeds to block 1135.

The process passes the measured transfer function ($\Delta\theta$) to FIG. 7, where the quadrant check is performed and an updated AFF MPDO is calculated. That AFF MPDO is then passed onto the AFF module, which applies a new cancellation force based on that new information (i.e., FIG. 7's quadrant checked calculated updated AFF MPDO). Then, the process iterates. In block 1135, the APC module 37-38 begins another iteration. The APC module 37-38 determines that the resultant force vector of block 1125 of the previous iteration is the measured force vector of the current iteration (such as the second iteration measured force). Specifically, the APC module 37-38 calculates the magnitude and phase angle of a cancellation force needed to substantially cancel the measured vibration force associated with the command signal of the previous iteration (such as the first iteration cancellation signal of block 1120). In block 1140, the APC module 37-38 performs a quadrant check by comparing the phase angle of the current iteration's cancellation force vector of block 1135 and the phase angle of the previous iteration's cancellation force vector of block 1110. The APC module 37-38 adds 0° or 180° to the MPDO values based on the comparison. In block 1145, the AFF controller 27-28 transmits a second cancellation signal including a MPDO values to the selected motor(s) using the $G_{AFF}$, the magnitude of the measured force vector of block 1125, and the MPDO values generated by the APC module. The APC module 37-38 can generate the MPDO values of the current iteration using Equation (6). That is, the APC module 37-38 can calculates the MPDO values using the quadrant check value of block 1140. The method 1100 returns to block 1125 after block 1145 to generate a resultant force vector for the current iteration (such as the second iteration), which is also the measured force vector for the next iteration (such as the third iteration), if necessary.

Figure 12:
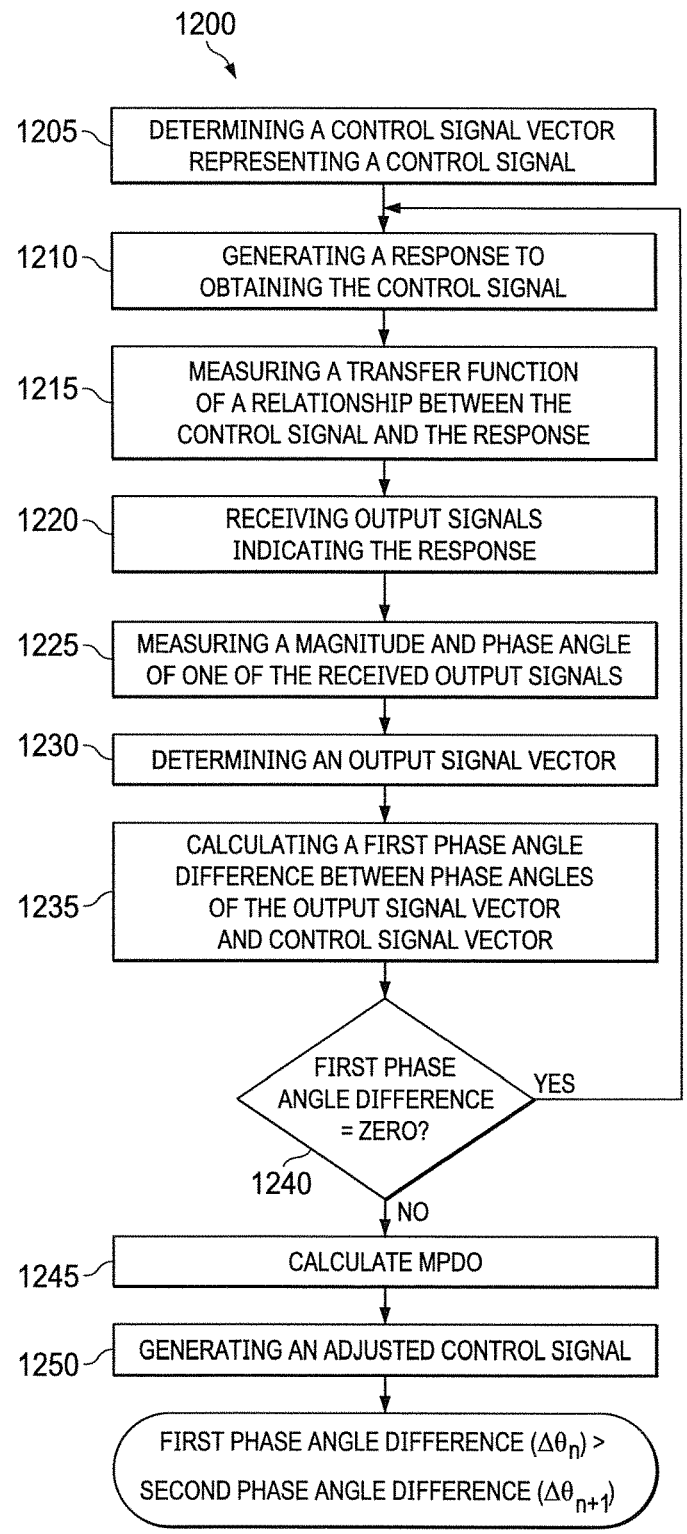
FIG. 12 illustrates an example method of determining mechanical phase delay offset (MPDO) values using adaptive phase control (APC) in a control system according to this disclosure.

FIG. 12 illustrates an example method 1200 of determining mechanical phase delay offset (MPDO) values using adaptive phase control (APC) in a control system according to this disclosure. The embodiment of the method 1200 shown in FIG. 12 is for illustration only. Other embodiments could be used without departing from the scope of this disclosure. The method 1200 can be implemented by an APC module or a system's controller configured to implement an APC algorithm or by any other suitable component(s). The method 1200 can be used to measure the transfer function of a controlled system and reduce phase angle differences between a control signal input to the system and an output signal received from the system.

In block 1205, the system's controller determines a magnitude and phase angle of a control signal vector. The control signal vector represents a control signal input to the system.

The control signal can be an electrical signal having at least each of magnitude, phase angle, and frequency.

In block 1210, in response to obtaining the control signal from the system's controller, the system generates a response. The system's response is measureable by a sensor or transducer (e.g., force transducer). In certain embodiments, the system obtains the control signal by generating the control signal for itself, such as in cases where the system's controller is part of the system. In certain embodiments, the control system obtains the control signal by receiving the control signal, such as in cases where the system is controlled by an external controller.

In block 1215, the system's controller measures a transfer function of a relationship between the control signal of block 1205 and the response of block 1210. In certain embodiments, the measuring the transfer function includes: receiving an output signal from the system (block 1220); measuring a magnitude and phase angle of the received output signal (block 1225); determining an output signal vector representing the received output signal (block 1230); and calculating a first phase angle difference between the phase angle of the output signal vector and the phase angle of the control signal vector (block 1235).

In block 1220, the system's controller receives, from a sensor, at least one output signal indicating the response from the controlled system. The sensor senses the response of the controlled system and generates an indicator of the response. The sensor can be a part of the system or coupled to a portion of the system. The sensor can include several sensors that provide multiple output signals to the system's controller. Each of the received output signals has a single frequency. For example, the multiple output signals can include various harmonic frequencies of a fundamental frequency. In certain embodiments a fundamental frequency included in the control signal.

In block 1225, for at least one the multiple output signals received by the system's controller, the method 1200 includes measuring a magnitude and phase angle of the received output signal.

In block 1230, for at least one the multiple output signals received by the system's controller, the method 1200 includes determining an output signal vector defined by the magnitude and phase angle of the received output signals (i.e., measured in block 1225).

In block 1235, for at least one the multiple output signals received by the system's controller, the method 1200 includes calculating a first phase angle difference between the phase angle of the output signal vector and the phase angle of the control signal vector.

In block 1240, in response to determining the first phase angle difference is not substantially equal to zero, the system's controller calculates the MPDO using the first phase angle difference (block 1245), and generates an adjusted control signal (block 1250). In certain embodiments, determining the first phase angle difference is not substantially equal to zero includes comparing the first phase angle difference to convergence limit value. The MPDO causes the relationship between the phase angle of the system's control signal (e.g., or input signal) to the phase angle of system's output signal to converge toward the transfer function of the system.

In block 1245, system's controller generates an adjusted control signal by adding the MPDO to the control signal.

Subsequently, in the next iteration of the method 1200, the system responds to obtaining (i.e., generating or receiving) the adjusted control signal from the system's controller (next iteration of block 1210). The system's controller determines a second output signal vector defined by the magnitude and phase of the response to the adjusted control signal (next iteration of block 1230). The system's controller can calculate a phase angle difference between the phase angles of the first output signal vector and the second output signal vector. That is, this second phase angle difference is a difference between the phase angle of the first output signal vector and a phase angle of a subsequently received output signal indicating a subsequent response of the control system to obtaining the adjusted control signal. Accordingly, the first phase angle difference is greater than the second phase angle difference.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 7 of 35 U.S.C. Section 112 as it exists on the date of filing hereof unless the words "means for" or "step for" are explicitly used in the particular claim.

What is claimed is:

1. A method comprising:

identifying a magnitude and a phase angle of vibration forces resulting from a previous cancellation signal, wherein a first measured force vector is defined by the magnitude and the phase angle of the vibration forces resulting from the previous cancellation signal;

calculating a magnitude and a phase angle of a first cancellation force, wherein a first cancellation force vector is defined by the magnitude and the phase angle of the first cancellation force;

transmitting a first adaptive feed-forward (AFF) cancellation signal to at least one motor coupled to at least one piston, the first AFF cancellation signal configured to cause the at least one motor to generate the first cancellation force;

identifying a magnitude and a phase angle of vibration forces resulting from the first AFF cancellation signal, wherein a first resultant force vector is defined by the magnitude and the phase angle of the vibration forces resulting from the first AFF cancellation signal;

determining whether a transfer function represented by a phase angle difference between the phase angle of the first resultant force vector and the phase angle of the first measured force vector is substantially equal to zero;

in response to determining that the transfer function represented by the phase angle difference is substantially equal to zero, continuing to transmit the first AFF cancellation signal to the at least one motor; and in response to determining that the transfer function represented by the phase angle difference is not substantially equal to zero:

calculating a magnitude and a phase angle of a second cancellation force, wherein a second cancellation force vector is defined by the magnitude and the phase angle of the second cancellation force;

transmitting a second AFF cancellation signal including an AFF mechanical phase delay offset (MPDO) value to the at least one motor to cause the at least one motor to generate a magnitude of a cancellation vector sum of the first and second cancellation forces and a phase angle defined by the AFF MPDO value, wherein the AFF MPDO value represents a compensation for the transfer function and a reduction of the phase angle of the second cancellation force compared to the phase angle of the first cancellation force; and measuring a magnitude and a phase angle of vibration forces resulting from the second AFF cancellation signal, wherein a second resultant force vector is defined by the magnitude and the phase angle of the vibration forces resulting from the second AFF cancellation signal.

2. The method of claim 1, wherein:
the first resultant force vector and a second measured force vector are equal; and
the method further comprises:
determining whether a second phase angle difference between the phase angle of the second resultant force vector and a phase angle of the second measured force vector is substantially equal to zero;
in response to determining that the second phase angle difference is substantially equal to zero, continuing to transmit the second AFF cancellation signal; and
in response to determining that the second phase angle difference is not substantially equal to zero, generating a third AFF cancellation signal.

3. The method of claim 2, further comprising:
in response to determining that the magnitude of the first measured force vector is not greater than a magnitude of the second measured force vector, reversing a sign of the AFF MPDO value.

4. The method of claim 1, wherein the phase angle of the first cancellation force is measured with reference to the first measured force vector.

5. The method of claim 1, wherein the first AFF cancellation signal is configured to cause the at least one motor to generate the first cancellation force to substantially cancel the vibration forces resulting from the previous cancellation signal.

6. The method of claim 1, wherein the magnitude of the first cancellation force is based on the magnitude of the first measured force vector and an AFF gain value corresponding to a specified number of iterations.

7. The method of claim 1, further comprising:
generating the first cancellation force using the at least one motor based on the first AFF cancellation signal in order to at least partially cancel the vibration forces resulting from the previous cancellation signal.

8. A non-transitory computer readable medium embodying a computer program comprising computer readable program code that when executed causes at least one processing device to:
identify a magnitude and a phase angle of vibration forces resulting from a previous cancellation signal, wherein a first measured force vector is defined by the magnitude and the phase angle of the vibration forces resulting from the previous cancellation signal;
calculate a magnitude and a phase angle of a first cancellation force, wherein a first cancellation force vector is defined by the magnitude and the phase angle of the first cancellation force;
transmit a first adaptive feed-forward (AFF) cancellation signal to at least one motor coupled to at least one piston, the first AFF cancellation signal configured to cause the at least one motor to generate the first cancellation force;
identify a magnitude and a phase angle of vibration forces resulting from the first AFF cancellation signal, wherein a first resultant force vector is defined by the magnitude and the phase angle of the vibration forces resulting from the first AFF cancellation signal;
determine whether a transfer function represented by a phase angle difference between the phase angle of the first resultant force vector and the phase angle of the first measured force vector is substantially equal to zero;
in response to determining that the transfer function represented by the phase angle difference is substantially equal to zero, continue to transmit the first AFF cancellation signal to the at least one motor; and
in response to determining that the transfer function represented by the phase angle difference is not substantially equal to zero:
calculate a magnitude and a phase angle of a second cancellation force, wherein a second cancellation force vector is defined by the magnitude and the phase angle of the second cancellation force;
transmit a second AFF cancellation signal including an AFF mechanical phase delay offset (MPDO) value to the at least one motor to cause the at least one motor to generate a magnitude of a cancellation vector sum of the first and second cancellation forces and a phase angle defined by the AFF MPDO value, wherein the AFF MPDO value represents a compensation for the transfer function and a reduction of the phase angle of the second cancellation force compared to the phase angle of the first cancellation force; and
measure a magnitude and a phase angle of vibration forces resulting from the second AFF cancellation signal, wherein a second resultant force vector is defined by the magnitude and the phase angle of the vibration forces resulting from the second AFF cancellation signal.

9. The non-transitory computer readable medium of claim 8, wherein:
the first resultant force vector and a second measured force vector are equal; and
the computer program further comprises computer readable program code that when executed causes the at least one processing device to:
determine whether a second phase angle difference between the phase angle of the second resultant force vector and a phase angle of the second measured force vector is substantially equal to zero;
in response to determining that the second phase angle difference is substantially equal to zero, continue to transmit the second AFF cancellation signal; and
in response to determining that the second phase angle difference is not substantially equal to zero, generate a third AFF cancellation signal.

10. The non-transitory computer readable medium of claim 9, wherein the computer program further comprises computer readable program code that when executed causes the at least one processing device to:

in response to determining that the magnitude of the first measured force vector is greater than a magnitude of the second measured force vector, add 0° to the AFF MPDO value; and in response to determining that the magnitude of the first measured force vector is not greater than the magnitude of the second measured force vector, add 180° to the AFF MPDO value.

11. The non-transitory computer readable medium of claim 8, wherein the phase angle of the first cancellation force is referenced to the first measured force vector.

12. The non-transitory computer readable medium of claim 8, wherein the first AFF cancellation signal is configured to cause the at least one motor to generate the first cancellation force to substantially cancel the vibration forces resulting from the previous cancellation signal.

13. The non-transitory computer readable medium of claim 8, wherein the magnitude of the first cancellation force is based on the magnitude of the first measured force vector and an AFF gain value corresponding to a specified number of iterations.

14. An apparatus comprising:
processing circuitry configured to:
identify a magnitude and a phase angle of vibration forces resulting from a previous cancellation signal, wherein a first measured force vector is defined by the magnitude and the phase angle of the vibration forces resulting from the previous cancellation signal;
calculate a magnitude and a phase angle of a first cancellation force, wherein a first cancellation force vector is defined by the magnitude and the phase angle of the first cancellation force;
transmit a first adaptive feed-forward (AFF) cancellation signal to at least one motor coupled to at least one piston, the first AFF cancellation signal configured to cause the at least one motor to generate the first cancellation force;
identify a magnitude and a phase angle of vibration forces resulting from the first AFF cancellation signal, wherein a first resultant force vector is defined by the magnitude and the phase angle of the vibration forces resulting from the first AFF cancellation signal;
determine whether a transfer function represented by a phase angle difference between the phase angle of the first resultant force vector and the phase angle of the first measured force vector is substantially equal to zero;
in response to determining that the transfer function represented by the phase angle difference is substantially equal to zero, continue to transmit the first AFF cancellation signal to the at least one motor; and
in response to determining that the transfer function represented by the phase angle difference is not substantially equal to zero:
calculate a magnitude and a phase angle of a second cancellation force, wherein a second cancellation force vector is defined by the magnitude and the phase angle of the second cancellation force;
transmit a second AFF cancellation signal including an AFF mechanical phase delay offset (MPDO) value to the at least one motor to cause the at least one motor to generate a magnitude of a cancellation vector sum of the first and second cancellation forces and a phase angle defined by the AFF MPDO value, wherein the AFF MPDO value represents a compensation for the transfer function and a reduction of the phase angle of the second cancellation force compared to the phase angle of the first cancellation force; and
measure a magnitude and a phase angle of vibration forces resulting from the second AFF cancellation signal, wherein a second resultant force vector is defined by the magnitude and the phase angle of the vibration forces resulting from the second AFF cancellation signal.

15. The apparatus of claim 14, further comprising:
at least one vibration sensor configured to measure the vibration forces.

16. The apparatus of claim 15, further comprising a cryogenic cooler;
wherein the at least one vibration sensor is configured to measure the vibration forces generated by multiple motors in the cryogenic cooler.

17. The apparatus of claim 14, wherein:
the first resultant force vector and a second measured force vector are equal; and
the processing circuitry is further configured to:
determine whether a second phase angle difference between the phase angle of the second resultant force vector and a phase angle of the second measured force vector is substantially equal to zero;
in response to determining that the second phase angle difference is substantially equal to zero, continue to transmit the second AFF cancellation signal; and
in response to determining that the second phase angle difference is not substantially equal to zero, generate a third AFF cancellation signal.

18. The apparatus of claim 17, wherein the processing circuitry is further configured to:
in response to determining that the magnitude of the first measured force vector is not greater than a magnitude of the second measured force vector, reverse a sign of the AFF MPDO value.

19. The apparatus of claim 14, wherein the magnitude of the first cancellation force is based on the magnitude of the first measured force vector and an AFF gain value corresponding to a specified number of iterations.

20. The apparatus of claim 14, wherein the processing circuitry is further configured to:
measure the phase angle difference between the phase angle of the first resultant force vector and the phase angle of the first measured force vector by monitoring the phase angle of the first AFF cancellation signal.

21. A method comprising:
determining a magnitude and a phase angle of a control signal vector representing a control signal, the control signal configured to cause a control system to generate a response in at least one motor coupled to at least one piston;
measuring a transfer function of a relationship between the control signal and the response by:
receiving, from at least one sensor, output signals indicating the response from the control system, wherein each of the received output signals has a single frequency, and
for at least one of the received output signals:
measuring a magnitude and a phase angle of the at least one received output signal;
determining an output signal vector defined by the magnitude and the phase angle of the at least one received output signal, and calculating a first phase angle difference between the phase angle of the output signal vector and the phase angle of the control signal vector; and in response to determining the first phase angle difference is not substantially equal to zero:
  calculating a mechanical phase delay offset (MPDO) using the first phase angle difference,
  generating an adjusted control signal by adding the MPDO to the control signal, and
  transmitting the adjusted control signal to the control system to generate a second response in the at least one motor coupled to the at least one piston;

wherein the first phase angle difference is greater than a second phase angle difference between the phase angle of the output signal vector and a phase angle of a subsequently received output signal indicating a subsequent response of the control system to obtaining the adjusted control signal.

* * * * *